United States Patent [19]
Asakura et al.

[11] Patent Number: 5,661,609
[45] Date of Patent: Aug. 26, 1997

[54] LENS MOUNT

[75] Inventors: Yasuo Asakura; Mitsuhiro Sato, both of Hachioji; Shinya Takahashi, Kodaira; Keita Takahashi, Hachioji, all of Japan

[73] Assignee: Olympus Optical Co., Ltd., Tokyo, Japan

[21] Appl. No.: 269,641

[22] Filed: Jun. 30, 1994

[30]  Foreign Application Priority Data

Jul. 6, 1993 [JP] Japan ................................. 5-167208
Jul. 6, 1993 [JP] Japan ................................. 5-167209
Jul. 6, 1993 [JP] Japan ................................. 5-167211

[51] Int. Cl.⁶ .................................................. G02B 7/02
[52] U.S. Cl. ...................... 359/826; 359/691; 359/700; 359/702
[58] Field of Search ............................. 359/691, 692, 359/700, 702, 826

[56]  References Cited

U.S. PATENT DOCUMENTS 5,170,294  12/1992  Haraguchi et al. ..................... 359/697
5,257,137  10/1993  Suzuki et al. .......................... 359/686

FOREIGN PATENT DOCUMENTS 167630  10/1986  Japan .
65531   3/1989   Japan .
52628   2/1992   Japan .
61739   8/1993   Japan .

*Primary Examiner*—Georgia Y. Epps
*Assistant Examiner*—Thomas Robbins
*Attorney, Agent, or Firm*—Louis Weinstein

[57]  ABSTRACT

A lens assembly includes a third lens group frame having an end face extending in an optical-axis direction provided with an end-face cam having displacement along a peripheral direction, for retaining a third group of lenses, a second lens group frame having a cam follower abutted against the end-face cam for retaining a second group of lenses, a second lens group spring for biasing the second lens group frame toward the third lens group frame, a rotational regulating for regulator rotation of one of the third lens group frame and the second lens group frame around an optical axis, and rotator for rotating the other of the third lens group frame and the second lens group frame around an optical axis when zoom operation is performed, wherein the end-face cam and a cam follower are operated by relative angular movement of the third lens group frame and the second lens group frame, around the optical axis at the time the zoom operation is performed to modify spacing therebetween in the optical-axis direction.

24 Claims, 26 Drawing Sheets

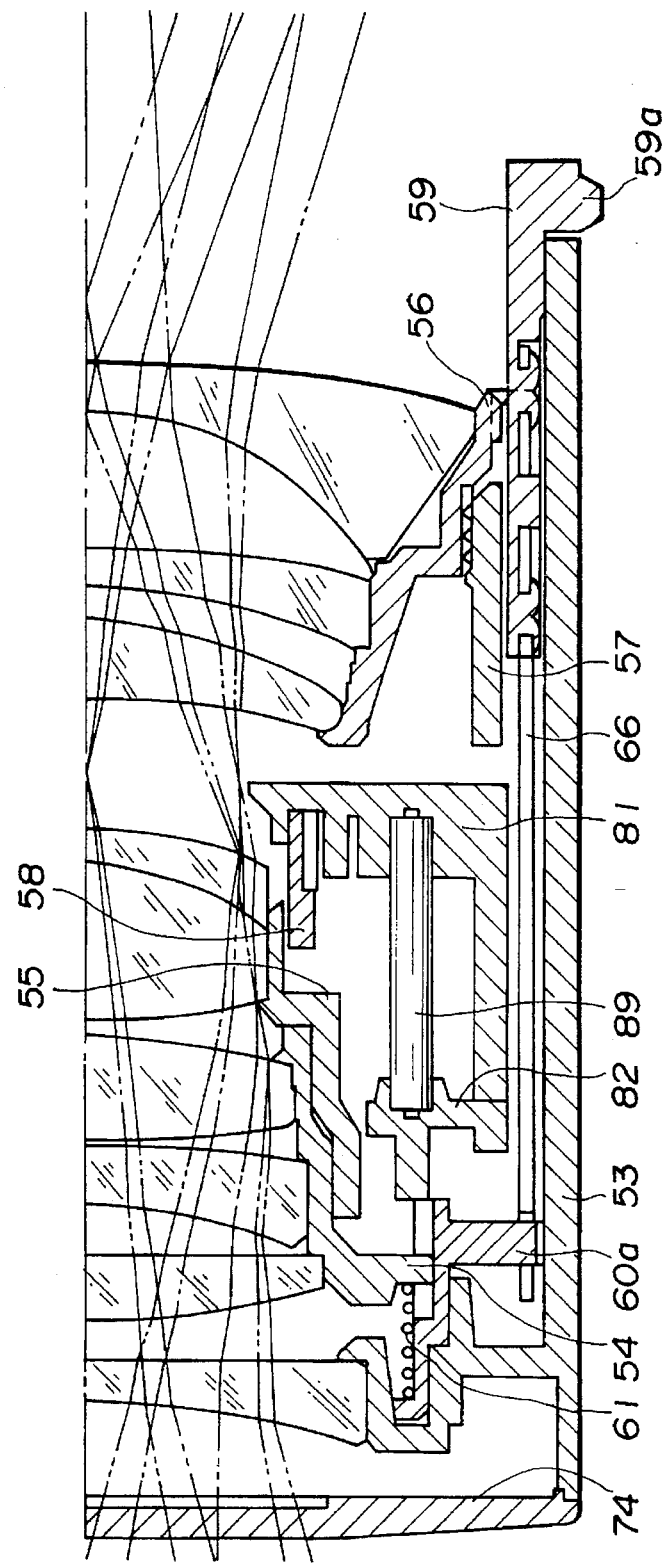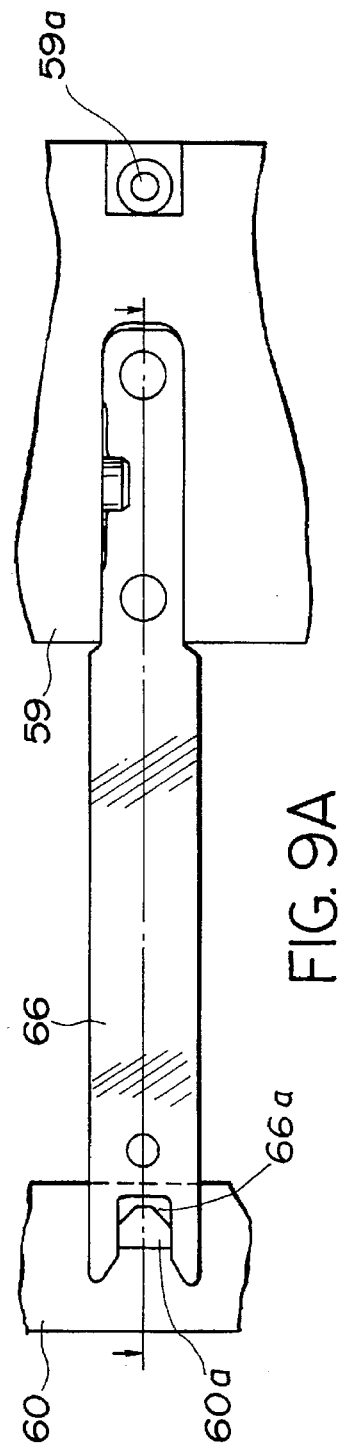

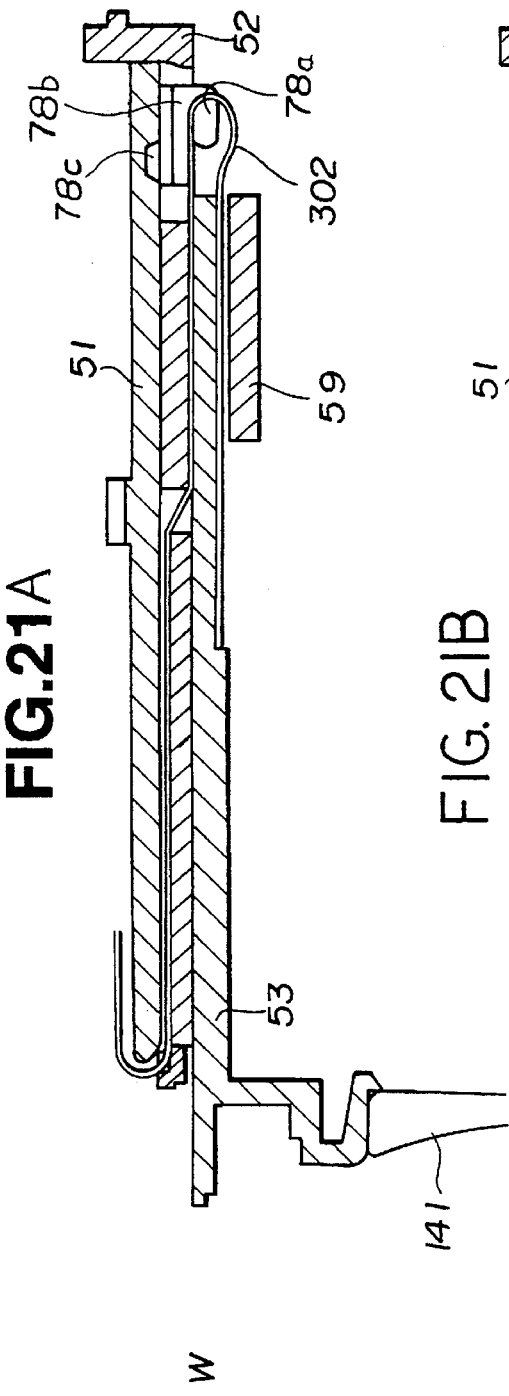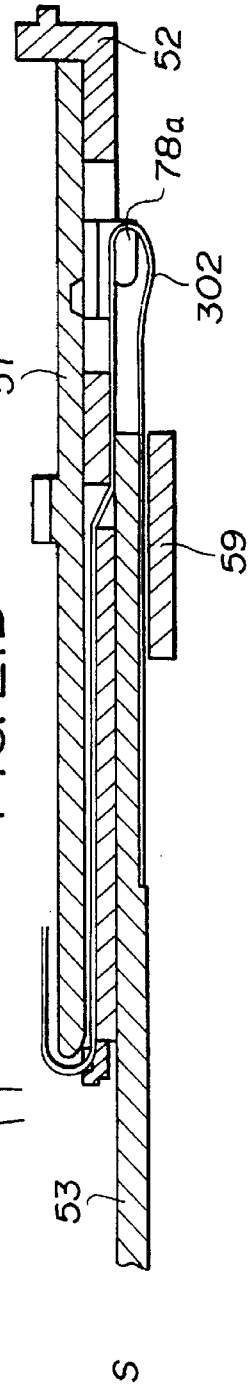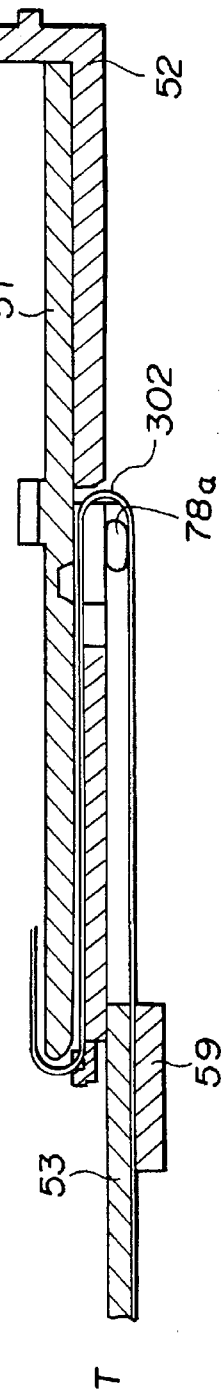

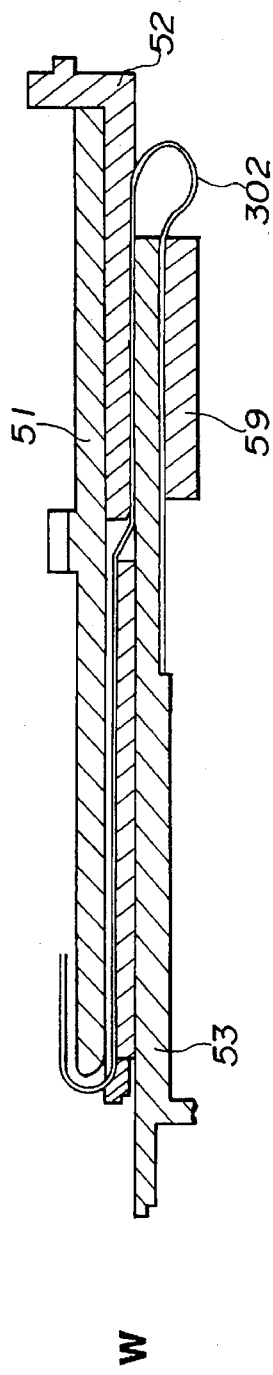
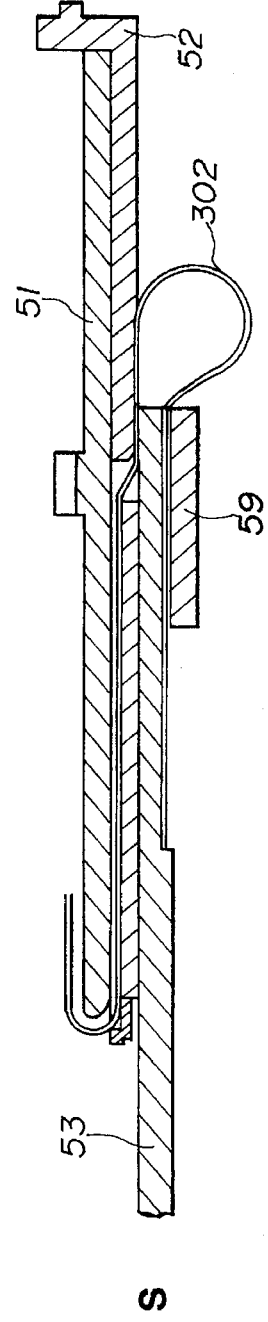
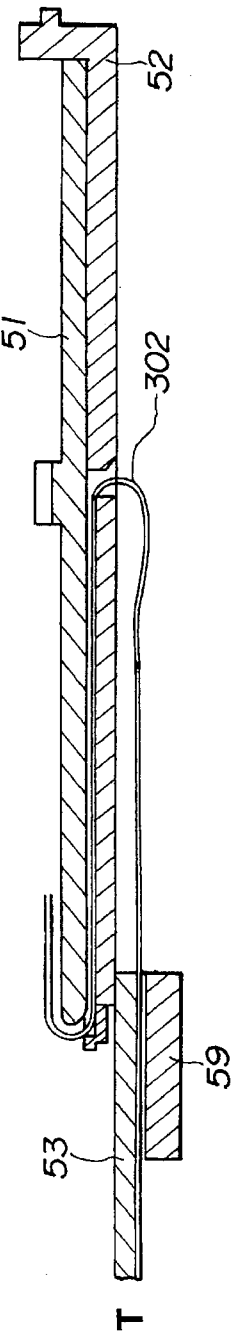

LENS MOUNT

BACKGROUND OF THE INVENTION

1. Field of the Invention

This invention relates to lens barrels or lens mounts and, more particularly to a lens mount comprising a plurality of groups of lenses which are integrally moved in an optical-axis direction while spacing between them in the optical-axis direction is changed or modified when zoom operation is performed, and the spacing between them in the optical-axis direction is fixed when focusing operation is performed.

2. Related Art And Prior Art Statement

Hitherto, various kinds of lens mounts have been proposed in which a plurality of groups of lenses are moved upon zoom operation and upon focusing operation. For example, technical means has been proposed in Japanese Patent Laid-Open No. HEI 2-162251 (162251/1990) in which an angular movement tube within a lens mount is divided into two including an inner angularly moving tube and an outer angularly moving tube, the inner angularly moving tube and the outer angularly moving tube are angularly moved integrally upon zoom operation, and one of the inner angularly moving tube and the outer angularly moving tube is moved longitudinally or before and behind upon focusing operation.

However, a radial size or dimension of the lens mount increases because the angularly moving tubes are arranged as inner and outer tubes. Thus, the above-discussed technical means is not preferable for a camera in which small sizing or miniaturization has been much desired recently.

Further, hitherto, various technical means have been proposed regarding opening and closing operation of a lens barrier mechanism for a camera. For example, technical means has been disclosed in Japanese Patent Laid-Open No. SHO 64-65531 (65531/1989) in which a drive motor of an auto-focus mechanism is also used in driving of the barrier mechanism.

However, the above-discussed technical means have the following problem. That is, since a deceleration or speed-reduction gear, a drive gear and the like are arranged with a wide space left with respect to the outside of the camera, coarse particulate or dust and sand enter from the outside. The coarse particulate and the sand bite into the gears or the like so that operational failure or malfunction occurs.

Meanwhile, hitherto, various lens mounts have been proposed which are provided with a flexible printed substrate or circuit board. For example, technical means has been proposed in Japanese Utility Model Laid-Open No. SHO 61-167630 (167630/1986) in which the flexible printed circuit board is wound and is arranged between a moving lens mount and a stationary or fixed lens mount.

Moreover, technical means has been proposed in Japanese Utility Model Laid-Open No. HEI 4-2829 (2829/1992) in which a flexible printed circuit board is bent into a U-shape at a rearward portion of a moving frame, and the vicinity of the bending is pressed down by a second moving frame.

However, in the technical means proposed in Japanese Utility Model Laid-Open No. SHO 61-167630 (167630/1986), assembling ability is low because assembling is performed after a plurality of locations have been formed, and there is a fear that extrusion or protrusion is generated into an operating portion or an effective light-beam portion because there is no guide.

Furthermore, in case where the second moving frame contains or includes an optical element, proposed in Japanese Utility Model Laid-Open No. HEI 4-2829 (2829/1992), the quantity of movement with respect to the first moving frame is not determined or decided freely, and eccentricity or the like is generated by a force of the flexible printed circuit board. Thus, this causes deterioration in performance.

OBJECTS AND SUMMARY OF THE INVENTION

A first object of the invention is to provide a lens mount in which a dimension or a size in a radial direction is reduced.

A second object of the invention is to provide a lens mount having a structure in which, in an optical system of a zoom lens having a plurality of groups of lenses in which spacing therebetween is changed or modified upon zoom operation, and which are integrally fed upon focusing operation, positions of the respective groups of lenses which are fed upon the focusing operation are maintained at high accuracy, and a dimension in a radial direction is restrained extremely low.

A third object of the invention is to provide a lens mount which prevents operational failure which is generated due to coarse particulate or dust, sand or the like which enters from the outside, from occurring.

A fourth object of the invention is to provide a lens mount in which, even if coarse particulate, dust or the like is accumulated on the side of a lower surface portion of a camera, of an outer peripheral portion on which the coarse particulate or dust or the like is apt to be accumulated, this has no effect upon operation of an angularly moving element so that operational failure or malfunction can be prevented from being generated.

A fifth object of the invention is to provide a lens mount in which coarse particulate, dust or the like is difficult to be accumulated on the mouth of an angular movement fitting portion so as to be capable of preventing operational failure due to the fact that the coarse particulate or dust enters the fitting portion.

A sixth object of the invention is to provide a lens mount which comprises a mechanism for securing to guide a flexible printed circuit board which has fewer parts.

A seventh object of the invention is to provide a lens mount in which a flexible printed circuit board which is arranged within the lens mount prevents a light beam from being shaded or eclipsed by extrusion into an effective light flux, by less parts, and which can prevent operational failure due to the fact that the flexible printed circuit board interferes with a movable element or that the flexible printed circuit board is put into a gap or the like between lens frames.

An eighth object of the invention is to provide a zoom lens mount which is of a drip-proof structure and which is small-sized.

Briefly, according to the invention, there is provided a zoom lens mount comprising:
  a plurality of groups of lenses which cooperate with each other to form a photographing optical system;
  a fixed frame;
  an angular movement frame angularly moved around an optical axis with respect the fixed frame upon zoom operation;
  a first moving frame regulated in angular movement around the optical axis with respect to the fixed frame and retractable in an optical-axis direction with respect to the fixed frame by an angular moving operation of the angular movement frame;

a second moving frame provided integrally with the first moving frame in the optical-axis direction and for angular movement around the optical axis, the second moving frame being engaged with cam means provided on the fixed frame, the second moving frame being retractable in the optical-axis direction together with the first moving frame in keeping with retraction of the first moving frame in the optical-axis direction and being angularly moved around the optical axis with respect to the first moving frame;

a first lens retaining frame provided integrally around the optical axis with respect to the second moving frame and retractable in the optical-axis direction for retaining one of the plurality of groups of lenses;

a second lens retaining frame provided integrally around the optical axis with respect to the first moving frame and retractable in the optical-axis direction, for retaining a group of lenses different from the group of lenses which is retained by the first lens retaining frame of the plurality of groups of lenses;

biasing means for applying a biasing force such that the first lens retaining frame and the second lens retaining frame are abutted against each other;

end-face cam means provided on end faces in the optical-axis direction which are abutted against each other, of the first lens retaining frame and the second lens retaining frame, for adjusting a distance in the optical-axis direction between them, by the angular movement of the first lens retaining frame with respect to the second lens retaining frame; and a focus element angularly moved with respect to the first lens retaining frame upon focusing operation, and integrally retracting the second lens retaining frame and the first lens retaining frame in the optical-axis direction through the end-face cam means to perform focusing operation.

These objects and advantages of the present invention will become further apparent from the following detailed explanation.

BRIEF DESCRIPTION OF THE DRAWINGS

FIGS. 9 and 9A are explanatory views showing a jointed or coupled state of an intermediate frame, an interlocking plate and a front frame, in the lens mount according to the first embodiment;

FIG. 9A is a bottom plan view of some of the internal components with the front lens group frame of FIG. 9 removed.

FIGS. 21A, 21B and 21C are cross-sectional views of a lens-frame flexible printed substrate or circuit board, an FPC guide and a peripheral portion thereof respectively under wide, standard and tele states, of the lens mount according to the first embodiment:

FIGS. 26A, 26B and 2C are cross-sectional view of a lens-frame flexible printed circuit board and a peripheral portion thereof respectively under wide, standard and tele states, in case where there is no FPC guide in the lens mount according to the first embodiment;

DETAILED DESCRIPTION OF THE PREFERRED EMBODIMENTS

Various embodiments of the invention will hereunder be described with reference to the accompanying drawings.

Figure 1:
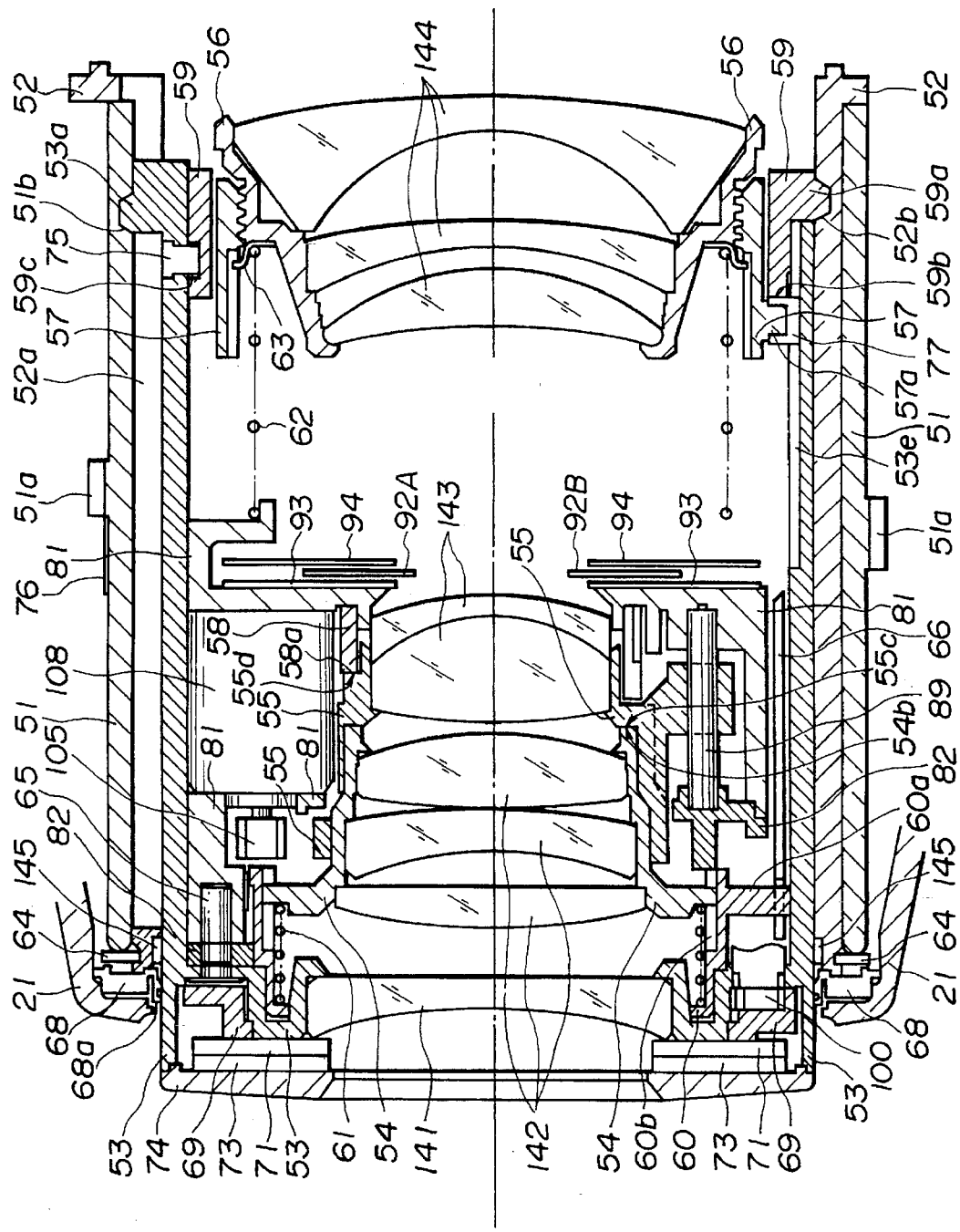
FIG. 1 is a central cross-sectional view showing a condition or state of an initial position (on the side of infinity) of a focus group upon a wide angle end, in a lens mount according to a first embodiment of the invention.
Figure 2:
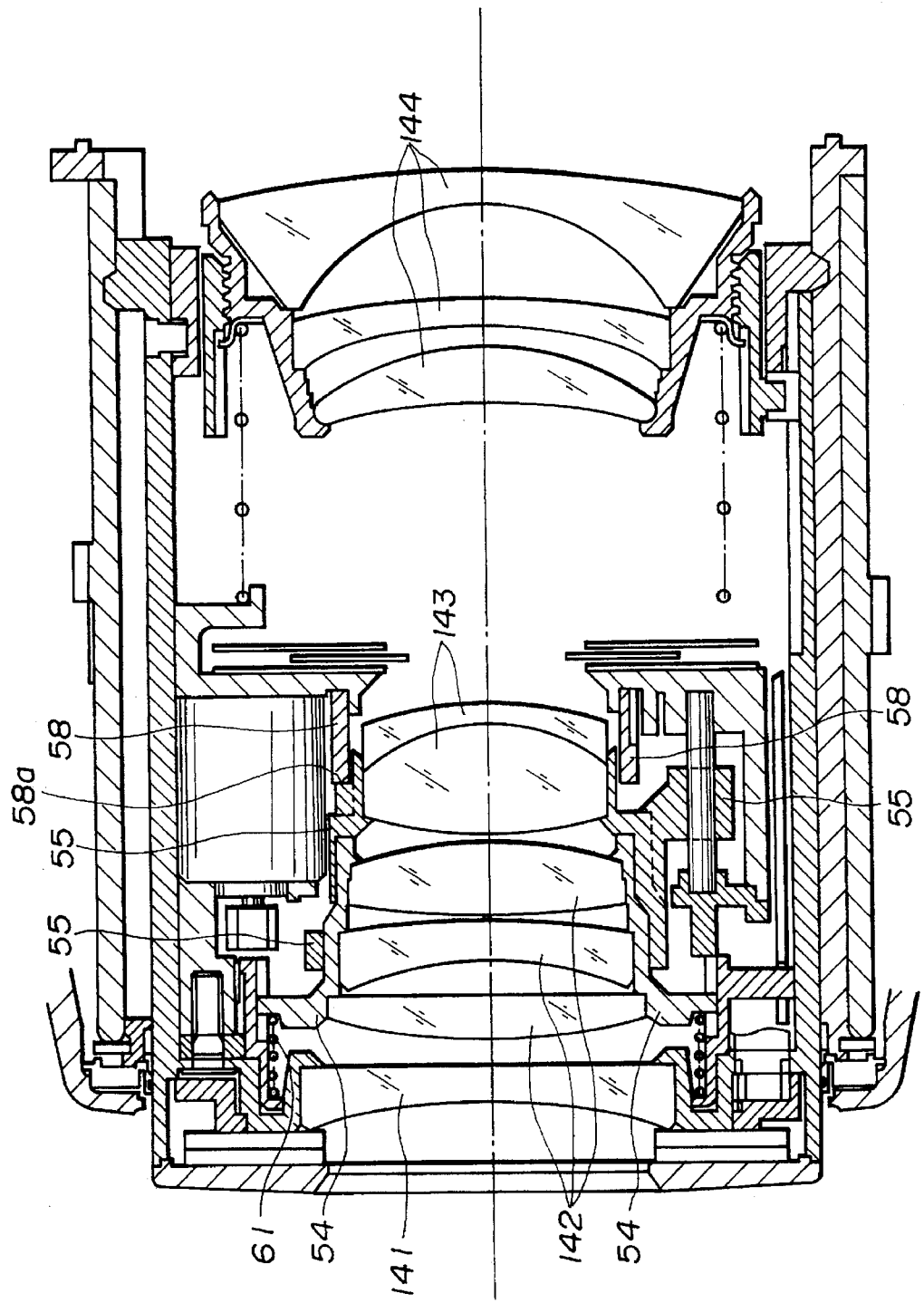
FIG. 2 is a central cross-sectional view showing a state of a feeding position (a close side) of the focus group upon a wide angle end, in the lens mount according to the first embodiment.
Figure 3:
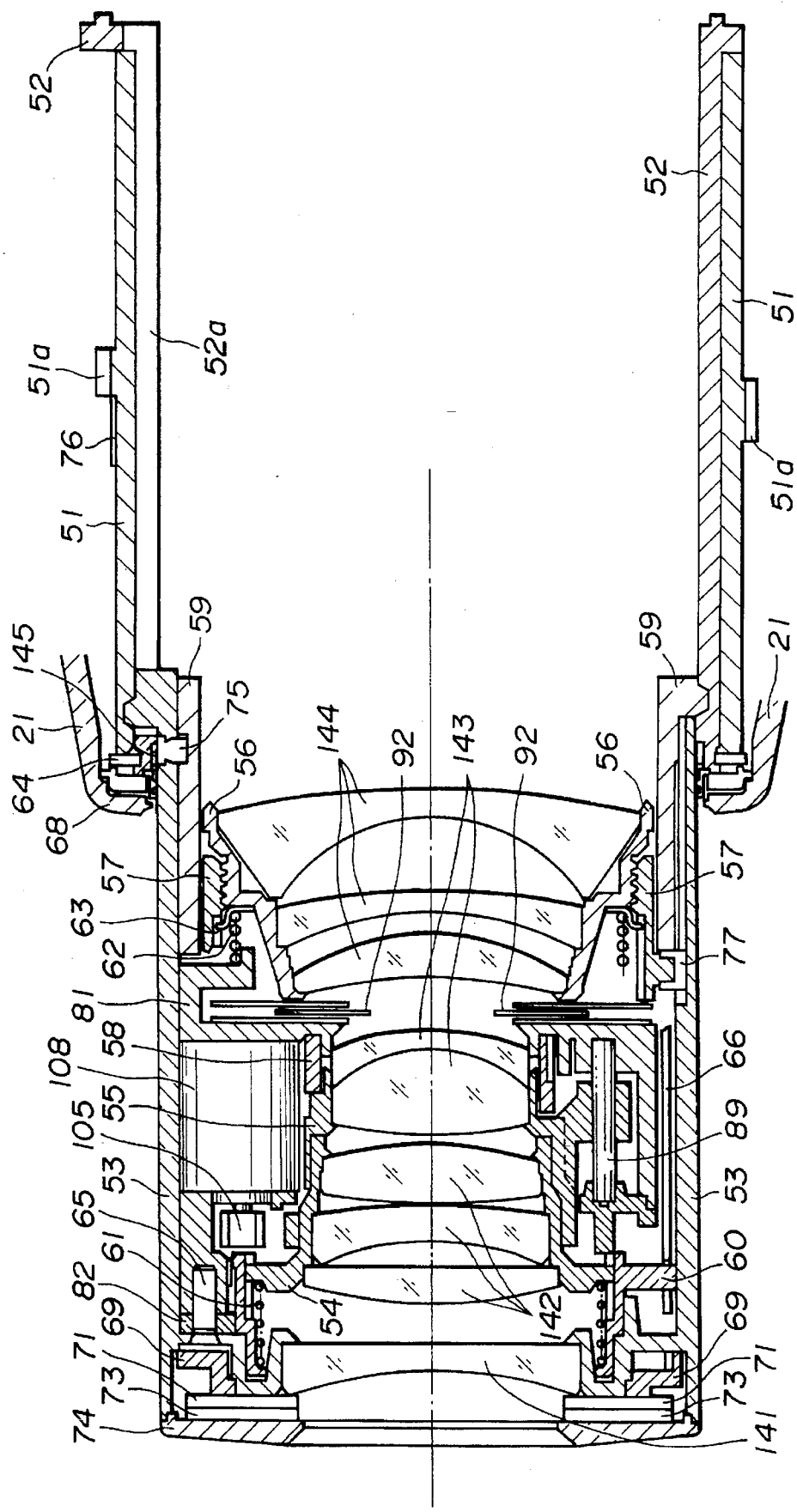
FIG. 3 is a central cross-sectional view showing a state of an initial position (an infinite side) of the focus group upon a telephoto end, in the lens mount according to the first embodiment.

FIGS. 1 to 3 are central cross-sectional views showing an arrangement of a lens mount according to a first embodiment of the invention. Further, FIGS. 5 to 8 are exploded perspective views showing a detailed arrangement of the lens mount. In this connection, FIG. 1 shows a state of an initial position (on the side of an infinity) of a focus group upon a wide angle end. FIG. 2 shows a state of a feeding position (on the close side) of the focus group upon the wide angle end, while FIG. 3 shows a state of the initial position (on the side of the infinity) of the focus group upon the wide angle end.

Figure 4:
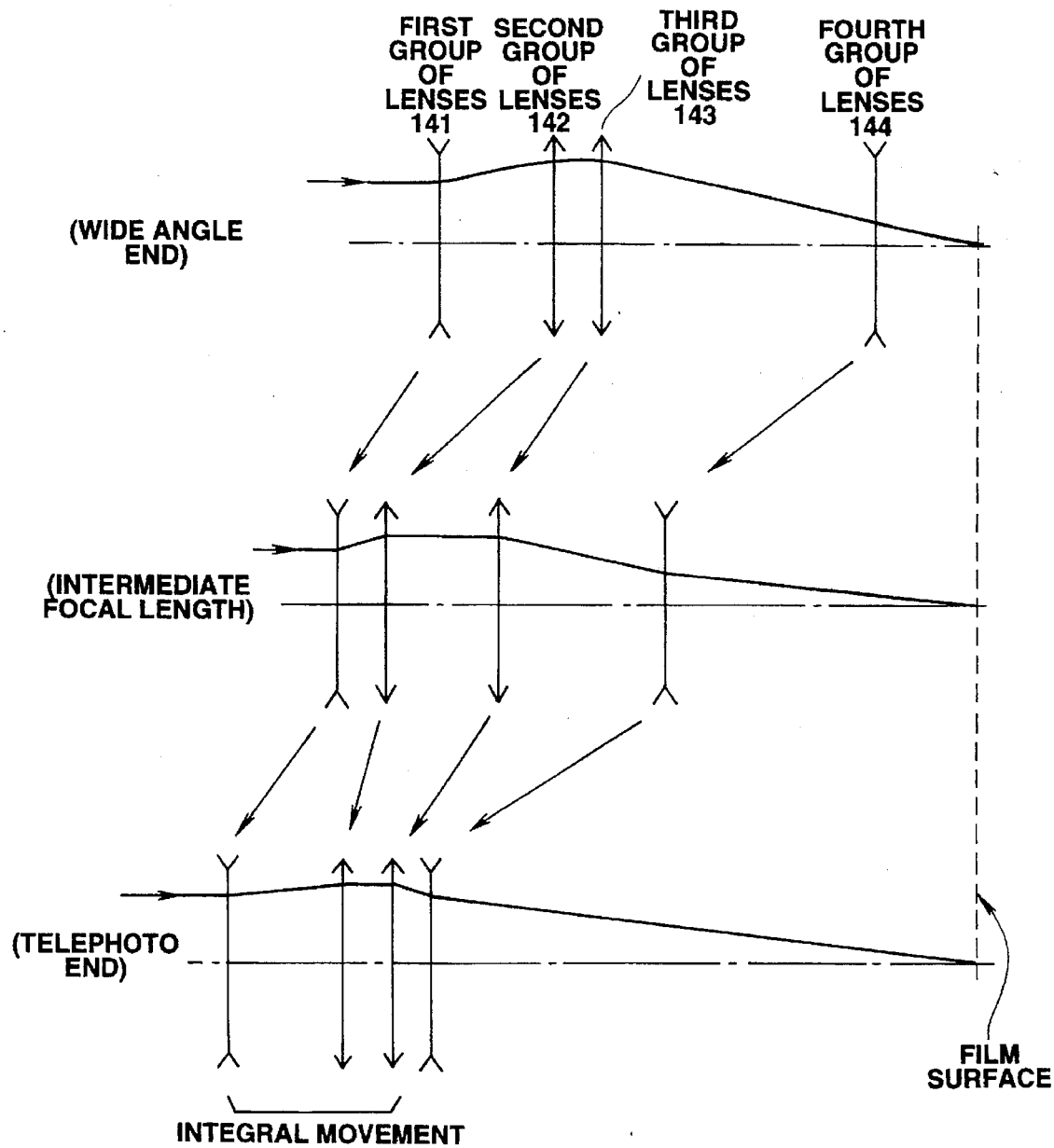
FIG. 4 is a conceptional view showing movement of each of the groups of lenses upon zooming, in the lens mount according to the first embodiment.

As shown in FIGS. 1 to 3, the lens mount is arranged such that a first group of lenses 141, a second group of lenses 142, a third group of lenses 143 and a fourth group of lenses 144 are respectively arranged from the front to the rear (i.e. from left to right). FIG. 4 is a view schematically showing movement of each of the groups of lenses upon zoom operation. However, as shown in FIG. 4, the first group of lenses 141 to the third group of lenses 143 of the groups of lenses are adapted to integrally move within the lens mount during reaching the telephoto end from the wide angle end.

Respective portions will hereunder be described in detail with reference to FIGS. 1 to 3 and FIGS. 5 to 8. In this connection, each of FIGS. 5 to 8 shows that various elements are exploded in an optical-axis direction.

Figure 5:
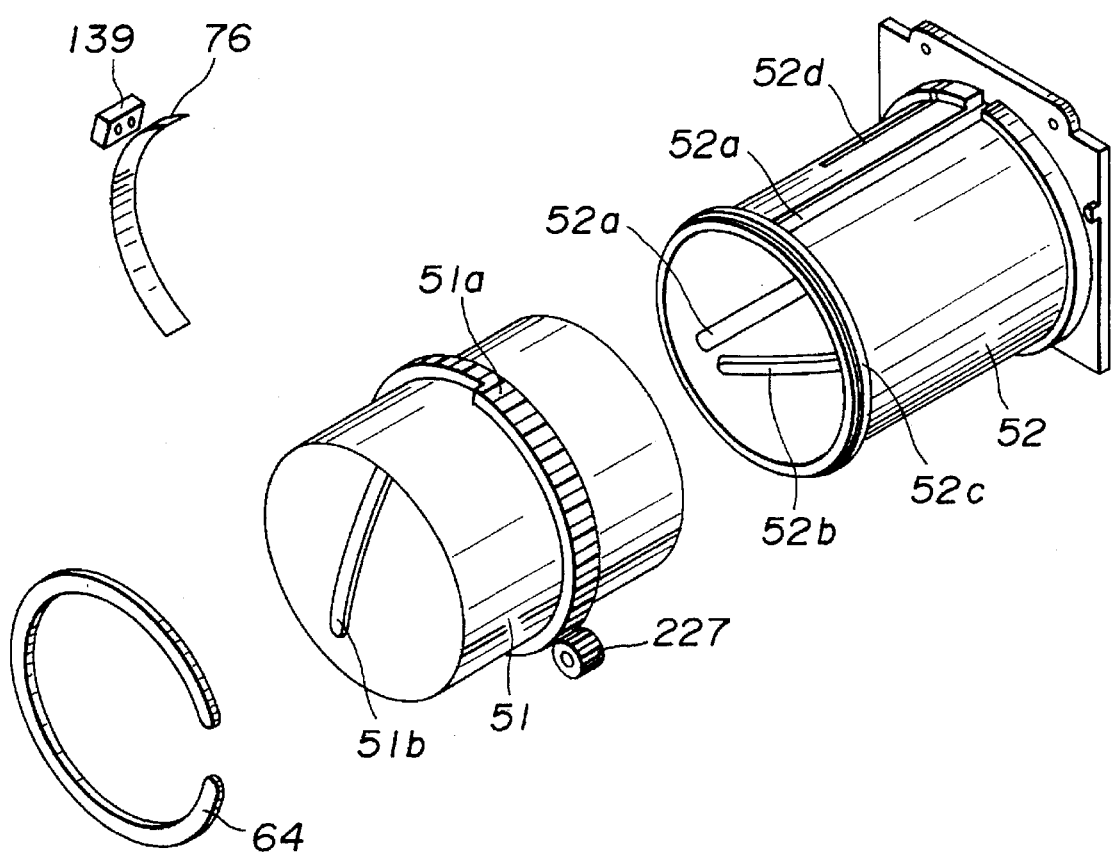
FIG. 5 is an exploded perspective view of the lens mount according to the first embodiment.

As shown in FIGS. 1 and 5, a fixed frame 52 of the lens mount is fixedly mounted on a camera body (not shown) at a rearward end thereof, and is formed with linear key grooves 52a into which linear keys 53b of three (3) locations arranged at a rearward end of a frame of a first group of lenses 53 (refer to FIG. 6) are fitted respectively, and a linear key groove 52d into which an FPC guide 78 (refer to FIG. 8) is fitted. Further, a rotary frame 51 is fitted about an outer periphery of the fixed frame 52 for angular movement. Moreover, a groove 52c is formed along a circumferential direction in an outer periphery of the fixed frame 52 at a forward end thereof. A C-ring 64 for engaging with the rotary frame 51 in the optical-axis direction is mounted in the groove 52c.

Figure 19:
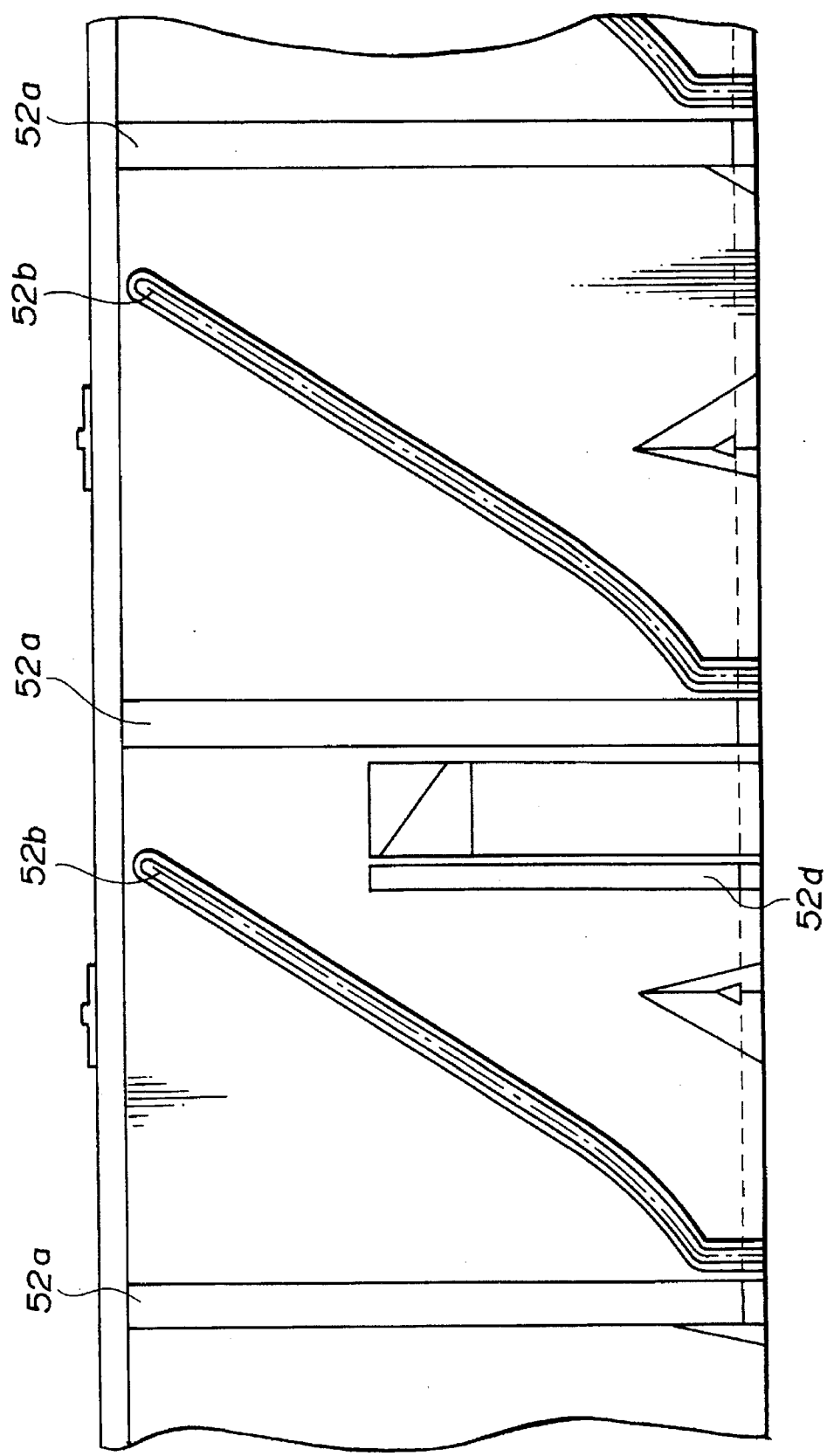
FIG. 19 is a developed view showing an inner surface portion of a stationary or fixed frame in the lens mount according to the first embodiment.

Meanwhile, the fixed frame 52 has an inner periphery thereof which is formed with a cam groove 52b which is fitted on cam followers 59a of an intermediate frame 59 (refer to FIG. 8) (FIG. 19 is a developed view of the fixed frame 52). Furthermore, a light shielding element 145 made of flocked cloth or the like for preventing unnecessary or un-required light from entering the lens frame from a gap between the fixed frame 52 and the first lens group frame 53 is fixedly mounted on an inner periphery of a forward end of the fixed frame 52.

The rotary frame 51 has an inner peripheral surface thereof which is fitted radially in an outer periphery of the fixed frame 52, as described above. Movement of the rotary frame 51 in the optical-axis direction is engaged by the C-ring 64 which is mounted on a forward end of the fixed frame 52. Thus, the rotary frame 51 is movable in an angular-movement direction with respect to the fixed frame 52 but movement thereof in the optical-axis direction is regulated (i.e. prevented).

Figure 20:
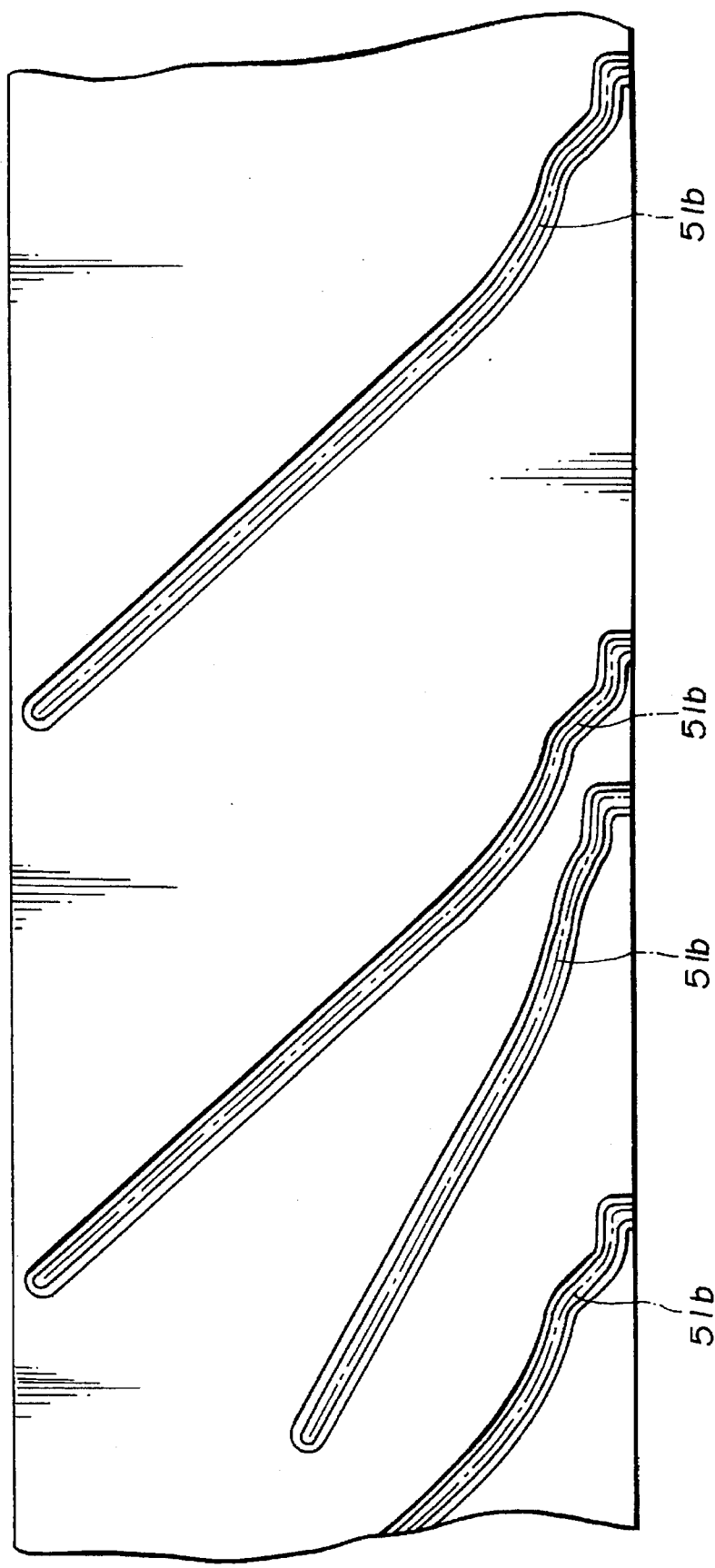
FIG. 20 is a developed view showing an inner peripheral portion of a rotary frame in the lens mount according to the first embodiment.
Figure 22:
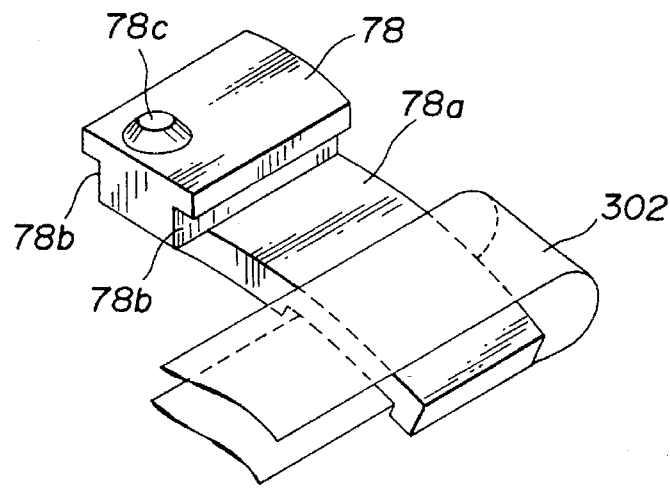
FIG. 22 is a perspective view of a principal portion, showing the lens-frame flexible printed circuit board and the FPC guide in the lens mount according to the first embodiment.

Moreover, the rotary frame 51 has an inner periphery thereof which is formed therein with a cam groove 51b having a bottom thereof for moving the first lens group frame 53 in the optical-axis direction, and a cam groove 51c having a bottom thereof for moving the FPC guide 78 in the optical-axis direction (FIG. 20 is a developed view thereof). The rotary frame 51 has an outer periphery thereof on which the gear 51a is formed. Thus, the arrangement is such that a zoom gear 227 that is an output gear of a zoom drive unit is in mesh therewith to perform rotary driving. Further, a pattern sheet 76 of a zoom encoder for a zoom photo reflector 139 which detects a zooming position of a zoom lens is fixedly mounted on the outer periphery of the rotary frame 51.

Figure 6:
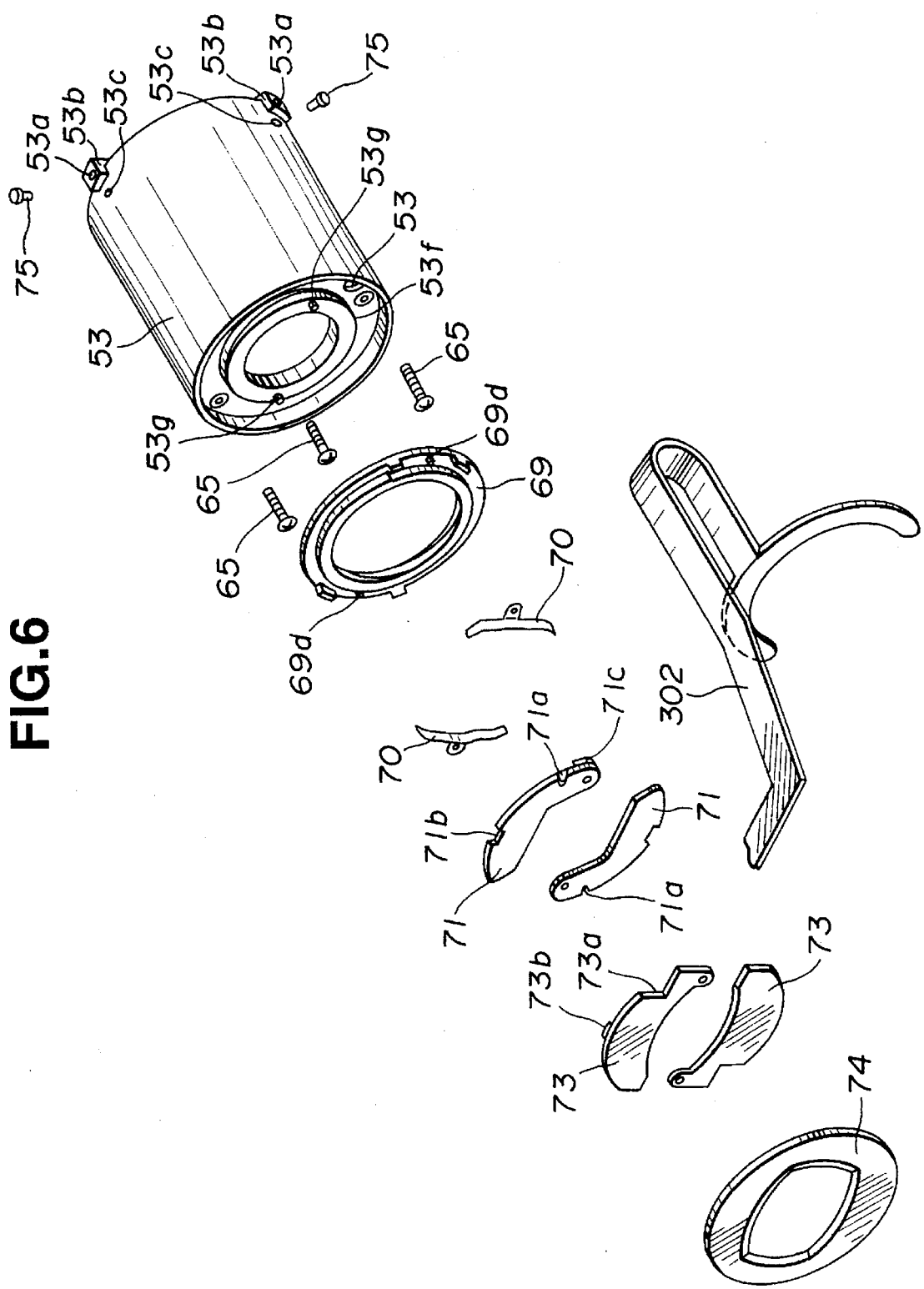
FIG. 6 is an exploded perspective view of the lens mount according to the first embodiment.

As shown in FIG. 6, the first lens group frame 53 that is a lens frame of the first group of lenses 141 has, at a rearward end thereof, an outer periphery thereof formed with the linear keys 53b which are fitted respectively in the linear key grooves 52a in the fixed frame 52 at equal intervals. Thus, the first lens group frame 53 is capable of being moved in the optical-axis direction with respect to the fixed frame 52. Moreover, the linear keys 53b have upper surfaces thereof which are formed respectively with cam followers 53a which are fitted in the cam groove 51b in the rotary frame 51. Furthermore, a shutter bottom plate 81 (refer to FIG. 7) is fastened by screws 65 to the inner periphery of the first lens group frame 53 under a state in which the shutter bottom plate 81 is regulated in position in the radial direction and the rotational direction and a shutter lid or closure 82 (refer to FIG. 7) is put between the shutter bottom plate 81 and a front frame 60.

Further, the front frame 60 (refer to FIG. 7) and the middle frame 59 (refer to FIG. 8) are fitted in the inner periphery of the first lens group of frame 53 for angular movement in a peripheral direction. Rollers 77 which are mounted on the fourth lens group frame 57 (refer to FIG. 8) enter the inner periphery of the first lens group frame 53. Linear key grooves 53e (refer to FIG. 1) for regulating a fourth lens group frame 57 in the rotational direction are formed at three (3) locations in the inner periphery of the first lens group frame 53. Moreover, through bores 53c for pressingly fitting respectively, pins 75 for regulating the middle frame 59 into the optical-axis direction are formed through the inner periphery of the first group of lenses 53.

Furthermore, a barrier drive ring 69 for opening and closing a barrier is fitted in a forward end of the first lens group frame 53 in the optical-axis direction for angular movement in the radial direction. The forward end of the first lens group frame 53 is connected to a barrier drive gear 100b (refer to FIG. 7) which projects from a bore in the forward end of the first lens group frame 53.

Figure 8:
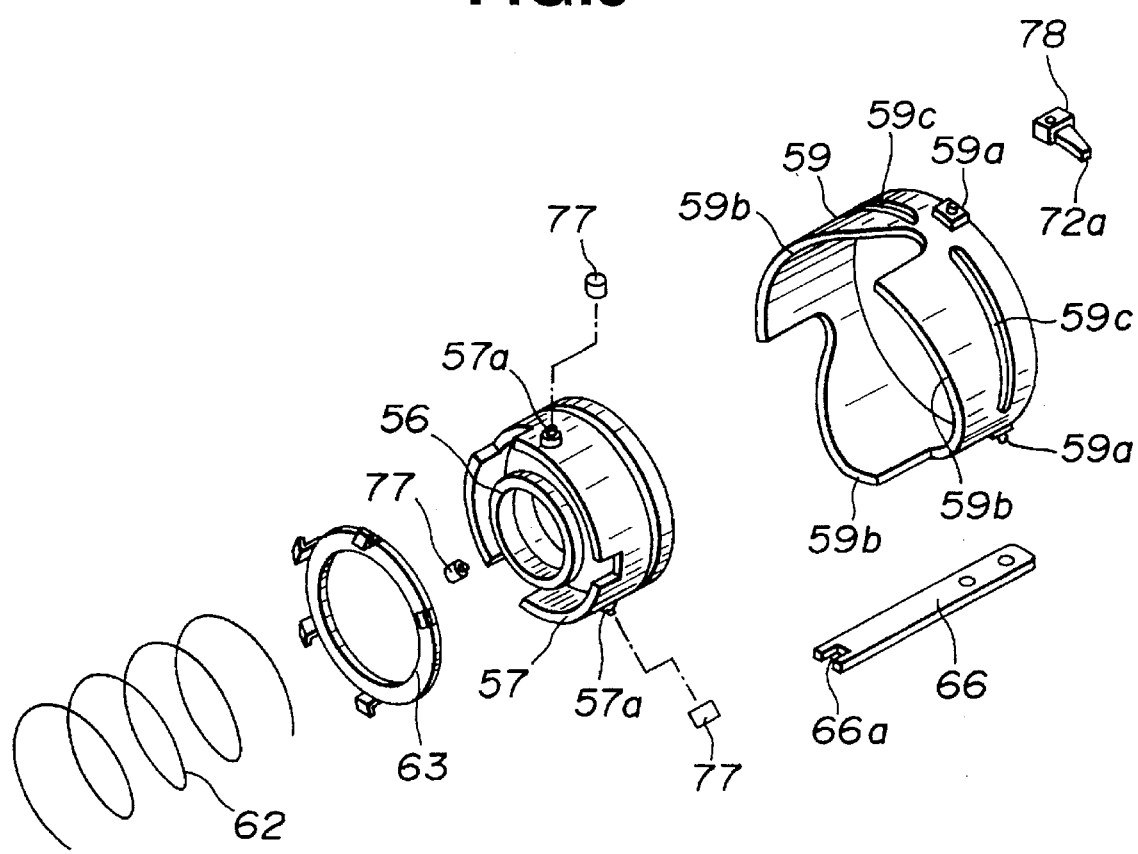
FIG. 8 is an exploded perspective view of the lens mount according to the first embodiment.

As shown in FIG. 8. the fourth lens group frame 57 is fastened by a screw such that a fourth lens group retaining frame 56 which retains the fourth group of lenses 144 becomes integral therewith. The fourth lens group frame 57 has an outer periphery thereof on which three pins 57a are provided in planting. The rollers 77 are fitted respectively upon the pins for rotation. The rollers 77 are fitted respectively in the linear key grooves 53e (refer to FIG. 1) which are provided in the inner periphery of the first lens group frame 53. Thus, the fourth lens group frame 57 is movable only in the optical-axis direction with respect to the first lens group frame 53, but is not moved in the angular movement direction.

Furthermore, a fourth lens group spring 62 is arranged between the fourth lens group frame 57 (refer to FIG. 8) and the shutter bottom plate 81 (refer to FIG. 7) through a spring retainer 63 therebetween. The rollers 77 are biased so as to be abutted always against respective end-face cams 59b of the middle frame 59.

The middle frame 59 has an outer periphery thereof which is fitted, in the radial direction, in an inner periphery of the first lens group frame 53 (refer to FIG. 6). Forward ends of respective pins 75 which are press-fitted from the outer periphery of the first lens group frame 53 are fitted respectively in grooves which are formed in the outer periphery of the middle frame 59, whereby the middle frame 59 is integrally retracted in the optical-axis direction with respect to the first lens group frame 53 and rotation thereof is freely retained. Moreover, the cam followers 59a which are fitted in the cam groove 52b in the fixed frame 52 are formed in the outer periphery of the middle frame 59. Furthermore, an interlocking plate 66 is fixedly mounted on the outer periphery of the middle frame 59 (see FIG. 9A). Further, the end-face cams 59b are formed on one end of the middle frame 59.

Figure 7:
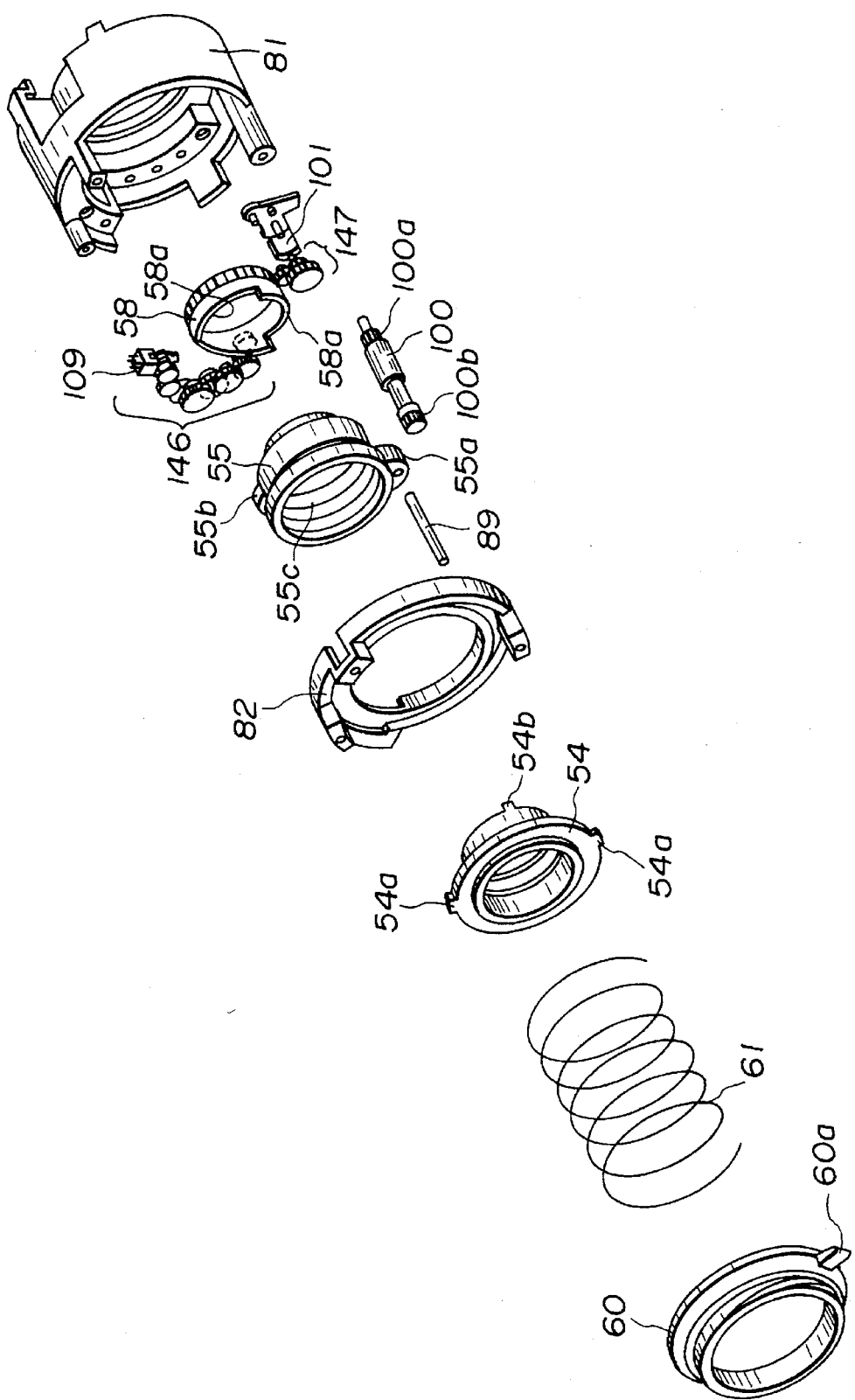
FIG. 7 is an exploded perspective view of the lens mount according to the first embodiment.
Figure 10:
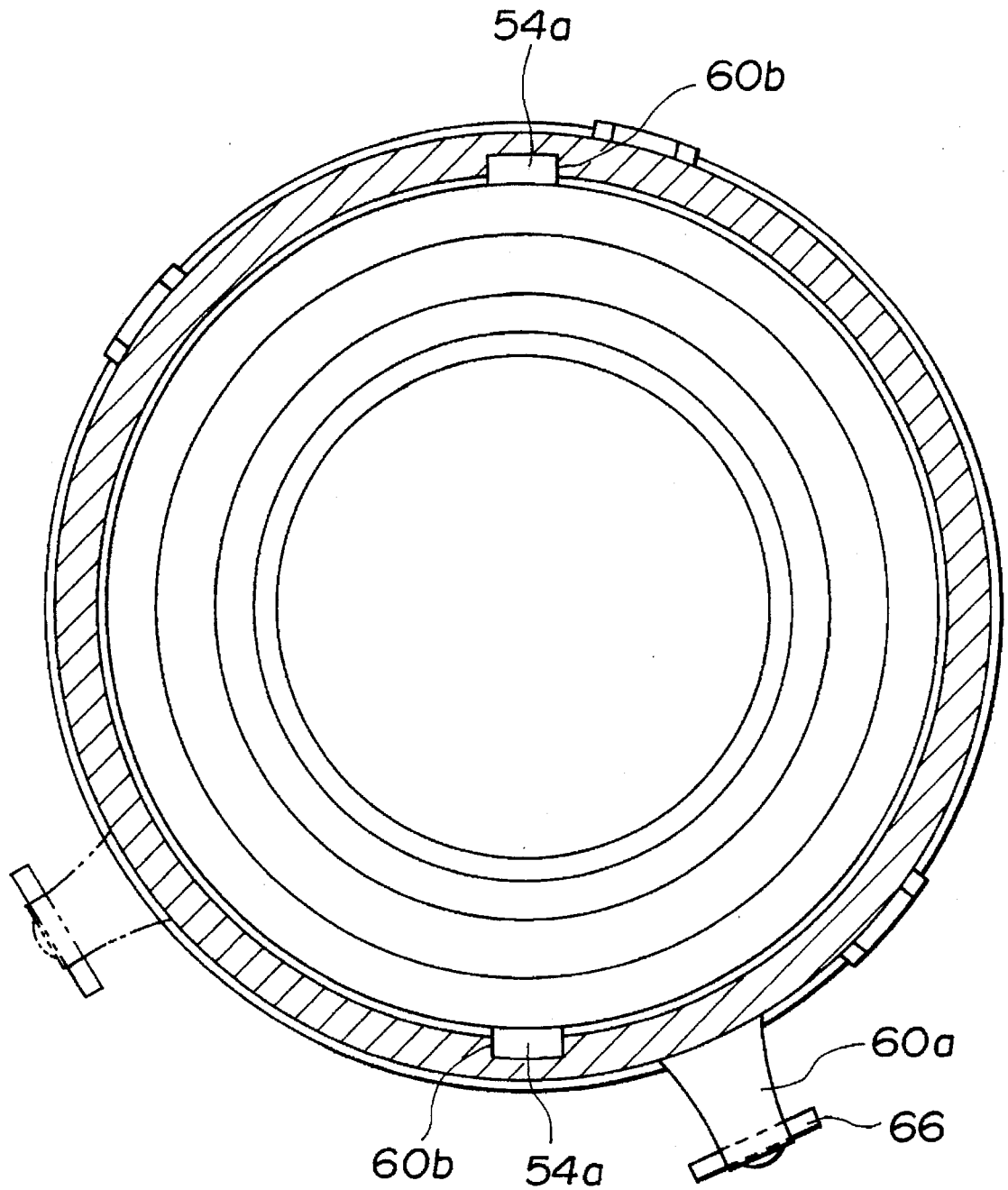
FIG. 10 is a cross-sectional view of a principal portion, showing a coupled state of a front frame, a second lens group frame and the interlocking plate, in the lens mount according to the first embodiment.

As shown in FIG. 7, the front frame 60 has an outer periphery thereof which is rotatably fitted in diameter in an inner periphery of the first lens group frame 53 and an inner periphery which is formed with a plurality of linear key grooves 60b (refer to FIG. 10) into which a plurality of linear keys 54a of the second lens group frame 54 are fitted respectively. A second lens group spring 61 that is a compression spring is arranged between the front frame 60 and the second lens group frame 54. Further, the outer periphery of the front frame 60 is formed with a projection 60a which is put into a gap 66a in the forward end of the interlocking plate 66. The projection 60a is so connected as to be integrally rotated together with rotation of the middle frame 59 (refer to FIGS. 9A and 10).

Thus, since the front frame 60 is fitted, in the radial direction, in the inner periphery of the first lens group frame 53 eccentricity with respect to the rotation of the second lens group frame 54 is minimized as far as possible as compared with the fact that the second lens group frame 54 is directly rotated by the interlocking plate 66. Thus, it is possible to maintain high optical performance.

Moreover, a barrier drive changing-over lever 101 for connecting a focal drive gear train 146 and a barrier drive gear train 147 to each other is arranged on the inner peripheral surface of the front frame 60. The inner peripheral surface of the front frame 60 is provided with a barrier drive changing-over lever-position regulating cam portion which regulates a position of the barrier drive changing-over lever 101 such that the connection is not performed under a state other than a collapsible mount state, and which regulates the position of the barrier drive changing-over lever 101 such that the interlocking plate 66 does not obstruct or disturb connection of the barrier drive changing-over lever 101 upon collapsible mount.

The second lens group frame 54 retains the second group of lenses 142 and is formed with a plurality of linear keys 54a which are fitted respectively in the plurality of linear key grooves 60b in the front frame 60. The second lens group frame 54 has a rearward end thereof which is formed with a cam follower 54b which is abutted against an end-face cam 55c which is formed on an inner peripheral surface of the third lens group frame 55. Furthermore, the second lens group spring 61 is positioned between a front end of the second lens group frame 54 and a rearward end of the front frame 60. Further, the linear keys of the second lens group frame 54 are fitted respectively in the key grooves 60b in the front frame 60. Thus, the second lens group frame 54 and the front frame 60 are integrally rotated in the rotational direction, but are freely retractable in the optical-axis direction with respect to each other. In this connection, a biasing force of the second lens group spring 61 so acts as to abut the cam follower 54b against the end-face cam 55c which is formed on the third lens group frame 55.

The third lens group frame 55 holds or retains the third group of lenses 143, and has an inner peripheral portion thereof which is formed with an end-face cam 55c on an end surface thereof in-the optical-axis direction, which is displaced along a circumferential direction. The third lens group frame 55 is formed with a cam follower 55d which is abutted against a cam portion 58a of a focus cam ring 58.

Figure 11:
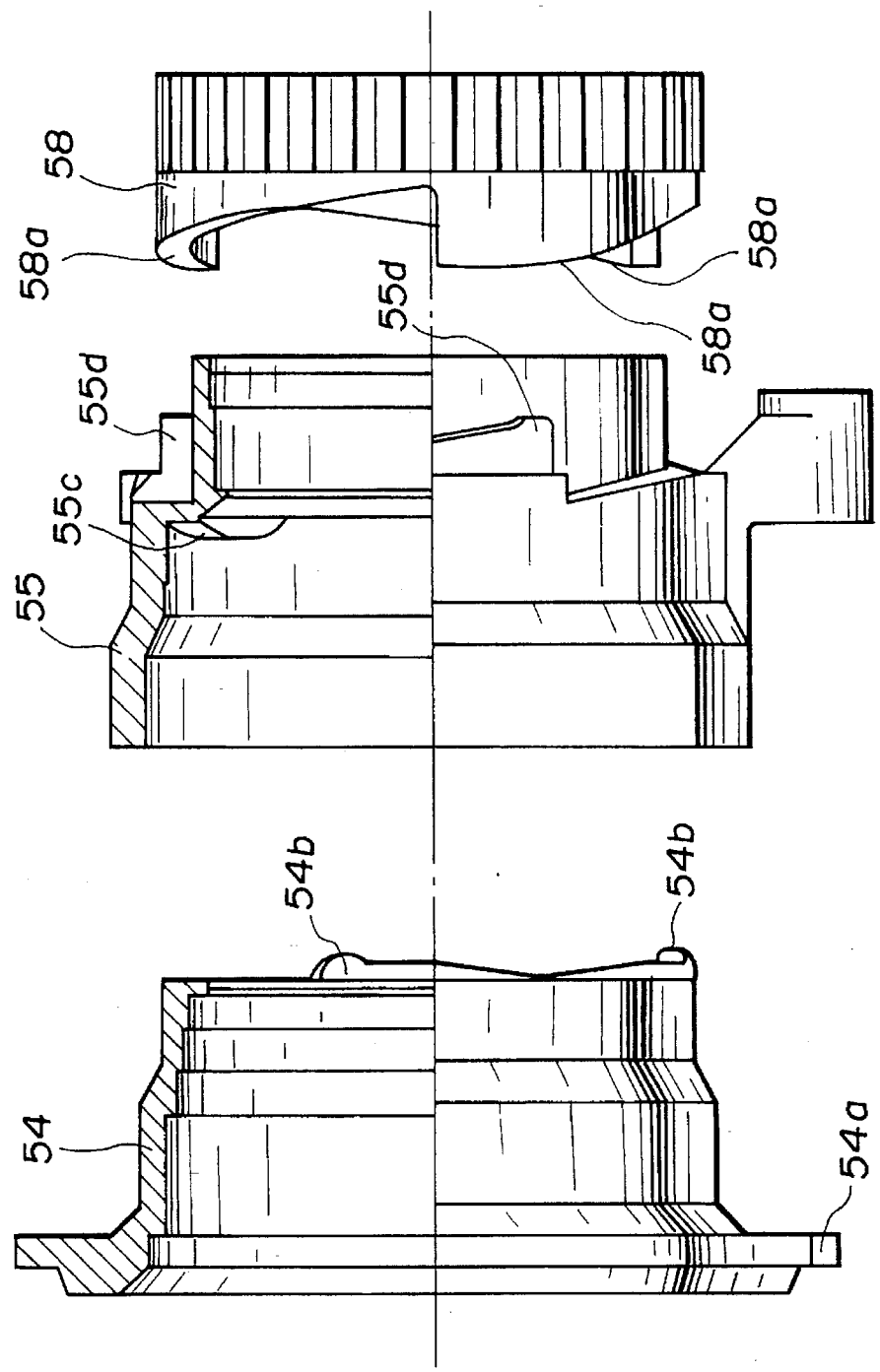
FIG. 11 is a side elevational view showing the second lens group frame, a third lens group frame and a focus cam ring, in the lens mount according to the first embodiment.

FIG. 11 is a partially sectionalized side elevational view showing the second lens group frame 54, the third lens group frame 55 and the focus cam ring 58, and showing the positional relationship between the cam followers 54b, the end-face cam 55c, the cam followers 55d and the cam portions 58a.

The cam followers 54b of the second lens group frame 54 are biased against the end-face cam 55c of the third lens group frame 55 by the biasing force of the second lens group spring 61. Further, the cam followers 55d of the third lens group frame 55 are abutted respectively against the cam portions 58a of the focus cam ring 58.

Moreover, as shown in FIG. 7, the outer peripheral surface of the third lens group frame 55 is formed with a projection in which the bore 55a is formed in projection in the optical-axis direction. Furthermore, the outer peripheral surface of the third lens group frame 55 is formed with a linear key 55b at a position substantially opposed against the projection with respect to the optical axis. A rod 89 which is retained between the shutter bottom plate 81 and the shutter closure 82 of the shutter unit is fitted in the bore 55a, and the linear key 55b is fitted in a groove (not shown) which is formed in the shutter bottom plate 81. Thus, the third group of lenses 55 is not rotatable, but is movable only in the optical-axis direction with respect to the shutter bottom plate 81.

As shown in FIG. 9, the interlocking plate 66 is fixedly mounted on the outer peripheral portion of the middle frame 59, and the outer-peripheral projection 60a of the front frame 60 is put into the gap 66a in the forward end of the interlocking plate 66, whereby the middle frame 59 and the front frame 60 are connected to each other so as to be integrally moved angularly. Further, the interlocking plate 66 is adapted to make the barrier drive changing-over lever 101 which connects the focal drive gear train 146 and the barrier drive gear train 147 to each other at the end face 66b of the interlocking plate 66 upon movement from a short focal end to a collapsible mount state, to a connecting state.

Figure 16:
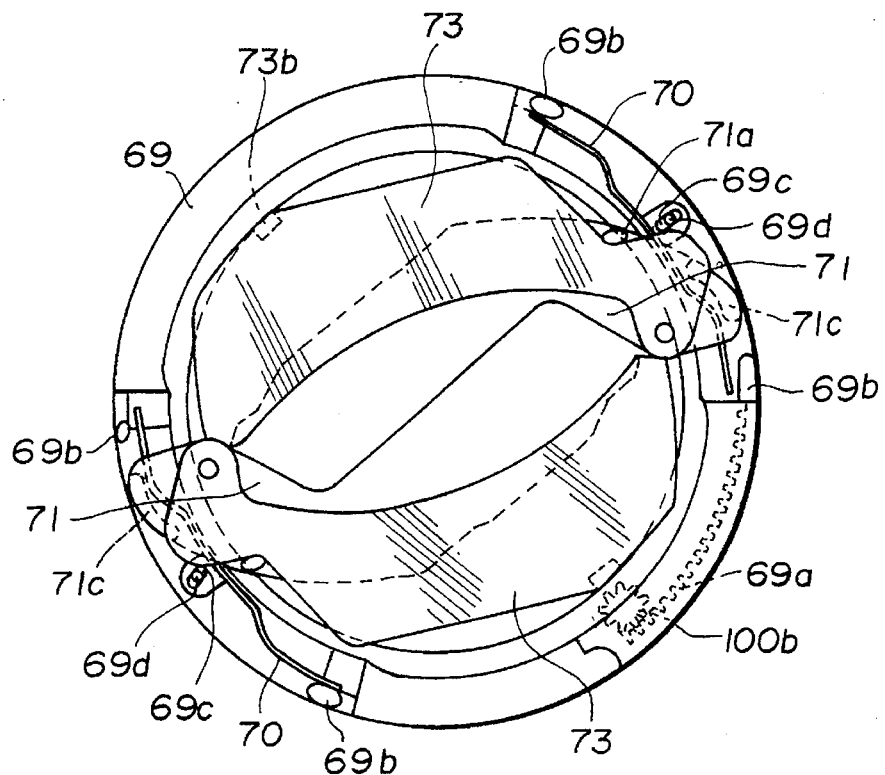
FIG. 16 is a view showing an open state of a barrier in the lens mount according to the first embodiment.
Figure 17:
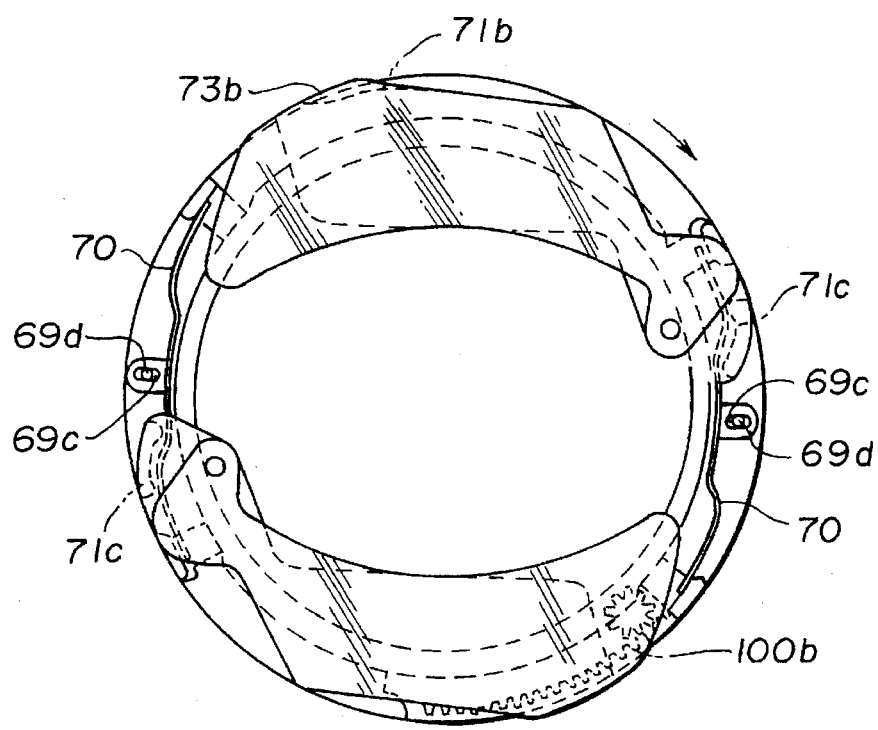
FIG. 17 is a view showing a closed state of a barrier in the lens mount according to the first embodiment.

As shown in FIG. 6, the barrier drive ring 69 is fitted for angular movement in a forward end 53f of the first lens group frame 53, at an inner diameter portion 69e. Further, as shown in FIGS. 16 and 17, the barrier drive ring 69 is connected to a barrier drive gear 100b by an internal gear 69a. The circumference or periphery of the connecting portion becomes a substantially or schematically closed state in the form of a bag. Planar barrier springs 70 having an illustrated contour or shape are arranged two (2) at positions diametrically opposed against each other at the internal gear 69a and the opposite surface (the side of the front surface of the camera), to bias vanes or blades 71, and to perform opening and closing of the barrier blades 71 and barrier blades 73 (refer to FIGS. 16 and 17).

Each of the barrier springs 70 is a plate-like spring on which a bending or folding portion is formed midway thereof, and is arranged on a circumference of the barrier drive ring 69 as shown in FIGS. 16 and 17. Each of the barrier springs 70 has both ends thereof which are abutted against projections 69b of the barrier drive ring 69. Further, projections 69d are fitted in and are inserted respectively into guide grooves 69c which are provided in opening in the folding portion. The barrier springs 70 are arranged on the barrier drive ring 69 under a state in which movement in the optical-axis direction and in the rotational direction are regulated.

As shown in FIG. 6, the barrier blades 71 are arms which are angularly movable respectively around bosses 53g which are provided in projection on a forward end of the first lens group frame 53. Two (2) blades which are the same in contour as each other are arranged on the first lens group frame 53. As shown in FIG. 16, each barrier blade 71 is formed with projections 71c biased respectively by the barrier springs 70, projections 71a which drive respectively the barrier blades 73 under a closed state, and recesses 71b for biasing projections 73b of the barrier blade 73 upon an open state.

The barrier blades 73 are arms which are angularly movable respectively around the bosses 53g at the forward end of the first lens group frame 53, similar to the barrier blades 71. Two (2) blades the same in contour as each other are arranged on the first lens group frame 53. As shown in FIG. 16, the barrier blades 73 are biased by the projections 71a of the barrier blades 71 toward a closed state, while the projections 73b are biased by the barrier blades 71 toward an open state, to thereby respectively perform opening and closing operations.

A cover ring 74 is so arranged as to be mounted on the forward end of the first lens group frame 53 to regulate (i.e. retain) positions of the barrier drive ring 69, the barrier blades 71 and the barrier blades 73 in the optical-axis direction.

Further, as shown in FIGS. 21A–21C and 22, the FPC guide (flexible printed circuit board guide) 78 is formed with engagements 78b which are fitted in the linear key groove 52d in the fixed frame 52, a cam follower 78c which is engaged with the cam groove 51c in the rotor frame 51, and an arm 78a which urges a lens frame flexible circuit board 302 which is arranged within the lens frame. The lens frame flexible printed circuit board 302 is assembled by the arm 78a so as to become a U-shape. The lens frame flexible printed circuit board 302 is driven in the optical-axis direction through an amount of movement approximately half the amount of feeding of the first lens group frame 53, by a cam of the rotary frame 51. Moreover, the FPC guide 78 is so arranged as to regulate the operating guide of the lens frame flexible printed circuit board 302 and expansion or spreading into the optical-axis direction by the arm 78a. Furthermore, in a case where there is no FPC guide 78, the flexible printed circuit board 302 spreads as shown in FIG. 26A–26C.

Figure 23:
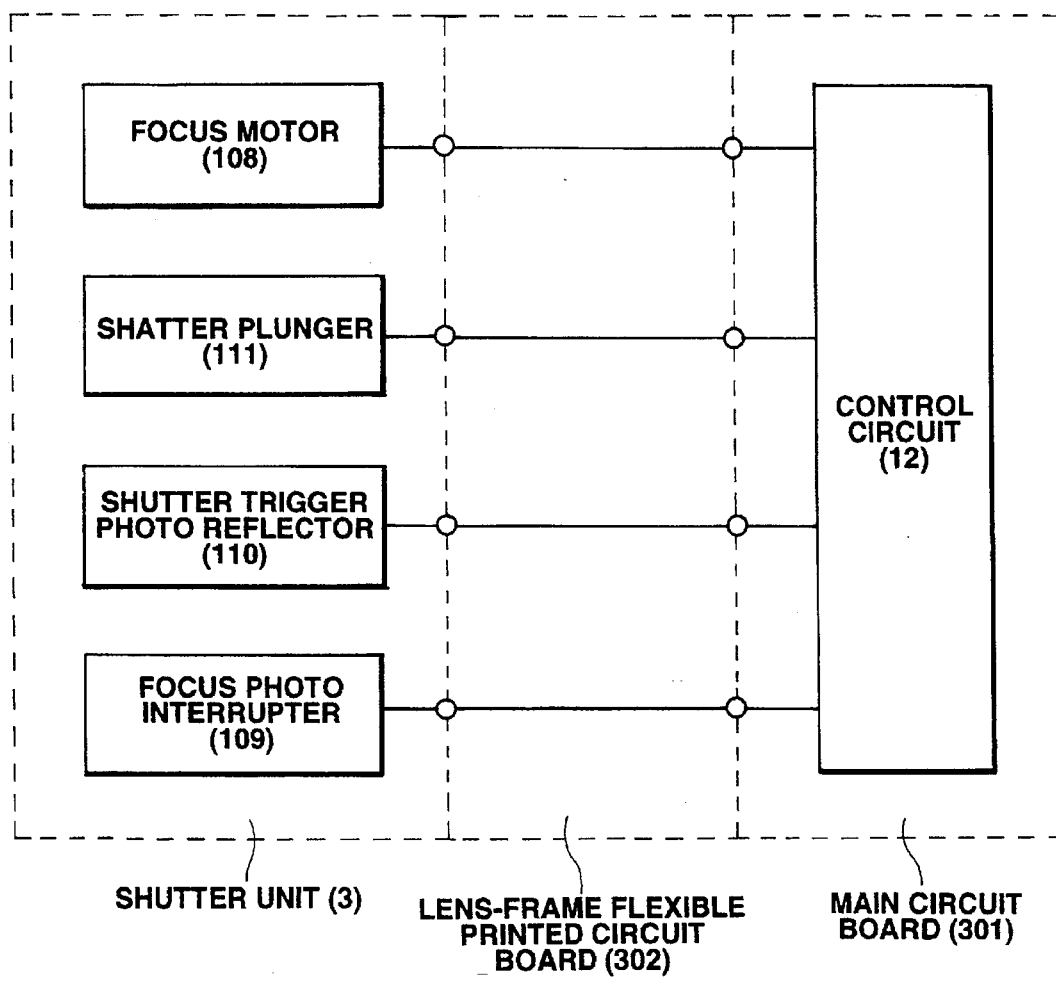
FIG. 23 is a conceptional view showing a flexible printed circuit board which connects a principal portion of a drive circuit in the lens mount according to the first embodiment.
Figure 24:
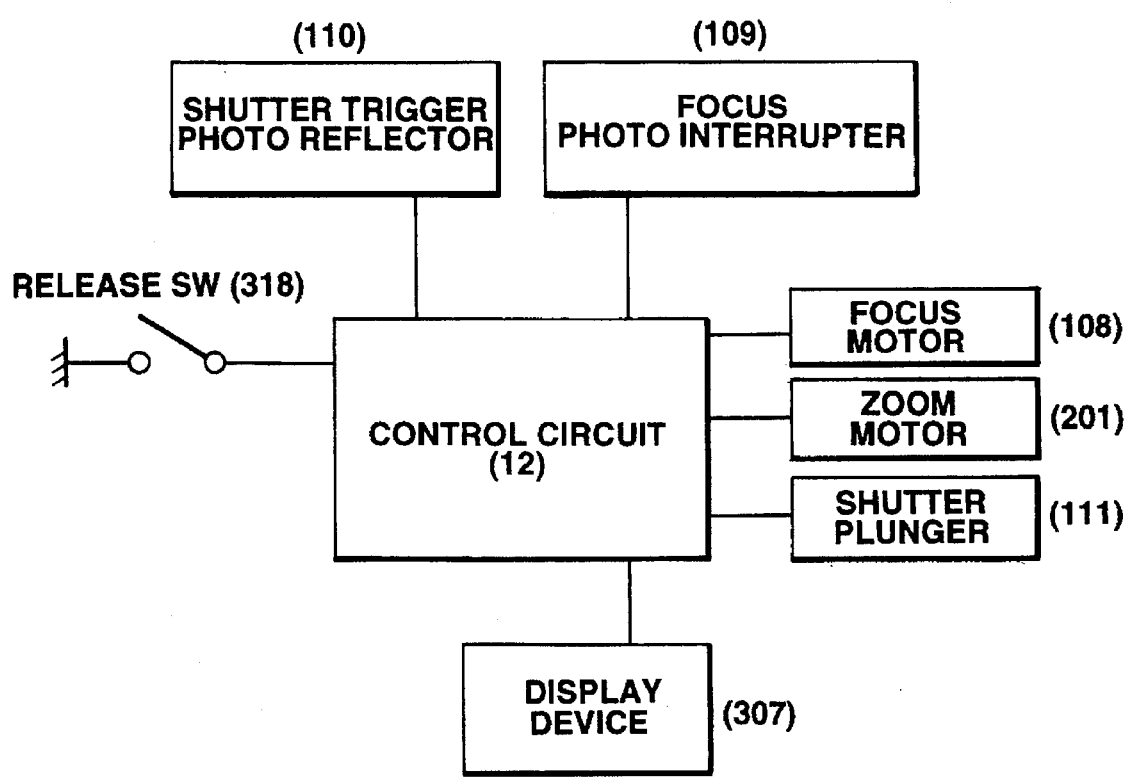
FIG. 24 is a block diagram showing an arrangement of a principal portion of the drive circuit in the lens mount according to the first embodiment.

FIG. 24 is a block diagram showing an arrangement of a principal portion of a drive circuit in the lens mount according to the first embodiment. Further, FIG. 23 is a conceptional view showing the flexible printed circuit board in which connection is made to the principal portion of the drive circuit.

A shutter unit 3 is arranged within the lens mount. Moreover, a focus motor 108, a shutter plunger 111, a shutter trigger photo reflector 110, a focus photo interrupter 109 and the like are arranged within the shutter unit 3. An actuator, a sensor or the like, a zoom motor 201, a display device 307, a release switch 318 and a control circuit 12 packed on a main circuit board 301 within the camera body are connected to each other by a lens frame flexible printed circuit board 302. In this connection, the actuator, sensor and the like will subsequently be described in detail.

Returning to FIG. 1, two (2) shutter blades 92A and 92B are arranged rewardly of the shutter bottom plate 81. The shutter blades 92A and 92B are normally closed so as to shield a flux of light or a luminous flux which is passed through the groups of lenses. By release operation, the shutter blades 92A and 92B open in a predetermined period of time and, subsequently, are closed. Further, the shutter blades 92A and 92B are movably mounted between blade retainers 93 and 94 which are fixedly mounted on the shutter bottom plate 81. The blade retainers 93 and 94 are adapted to perform a guide function upon opening and closing operation of the shutter blades 92A and 92B.

The focus motor 108 is fixedly mounted on the shutter bottom plate 81. A pinion gear 105 is fixedly mounted on an output shaft of the focus motor 108. The arrangement is such that angular movement output of the focus motor 108 is transmitted by the focal drive gear train 146 (refer to FIG. 7) to angularly move the focus cam ring 58, to thereby perform a focusing operation.

A sealing element 68 which is arranged at a forward end of the fixed frame 52 is an element for preventing water drops from entering the interior of the camera, and is made of elastic material. The side rearward of the camera is fixedly mounted on the fixed frame 52, while the outer peripheral side is fixedly mounted on the front side cover 21. An inner diameter side thereof is urged against the first lens group frame 53. Linear feeding operation of the first lens group frame is possible, and a lip portion 68a in linear contact in the form of a ring with the first lens group frame 53 at forward and rearward two locations so that water drops do not enter the interior of the camera.

Subsequently, zoom operation of the lens mount according to the first embodiment will be described.

First, zoom operation from a state of a lens frame short focal end illustrated in FIG. 1 to the long focal side illustrated in FIG. 3 will be described.

When a drive electric power source is supplied to a zoom motor 201 (refer to FIG. 24) which is arranged at a predetermined location of the camera body, a gear 227 (refer to FIG. 5) is driven so that the rotary frame 51 is angularly moved. When the rotary frame 51 is rotated in the clockwise direction as viewed from the subject side, the cam followers 53a of the first lens group frame 53 are engaged with the cam groove 51b in the rotary frame 51. Since movement in the rotational direction is regulated (i.e. prevented) by the linear key groove 52a in the fixed frame 52, the first lens group frame 53 moves linearly in the optical-axis left-hand direction (in the direction of the subject) in the figure.

At this time, the middle frame 59 is also moved in the optical-axis left-hand direction integrally with the first lens group frame 53 and, simultaneously, the middle frame 59 is rotated also in the clockwise direction by the cam on the inner periphery of the fixed frame 52. By rotation of the middle frame 59, the positions of the cams 59b of the middle frame 59 which is abutted against the roller 77 of the fourth lens group frame 57 are changed whereby the relative position of the fourth lens group frame 57 with respect to the first lens group frame 53 is changed.

The interlocking plate 66 which is fixedly mounted on the Outer periphery of the middle frame 59 is angularly moved integrally with the middle frame 59. In keeping therewith, the front frame 60 and the second lens group frame 54 engaged with the front frame 60 by the linear key are also rotated through an rotational angle the same as that of the middle frame 59. By this rotation, a contact position of the cam follower 54b of the second lens group frame 54 with respect to the end-face cam 55c of the third lens group frame 55 is changed. As a result, the relative spacing between the second group of lenses 142 and the third group of lenses 148 is changed.

By angular movement of the rotary frame 51, the FPC guide 78 is also moved in the optical-axis left-hand direction only through the amount approximately half that of the first lens group frame 58 so that the lens frame flexible circuit board 302 mounted on the shutter bottom plate 81 restrains extension or expansion in the optical-axis central direction within the lens frame.

The above description describes driving from the short focal side to the long focal side in the lens mount according to the embodiment. However, reverse driving from the long focal side to the short focal side can be realized by the fact that the rotary frame 51 is rotated in the counterclockwise direction.

A focus drive mechanism in the lens mount according to the embodiment will subsequently be described.

Figure 12:
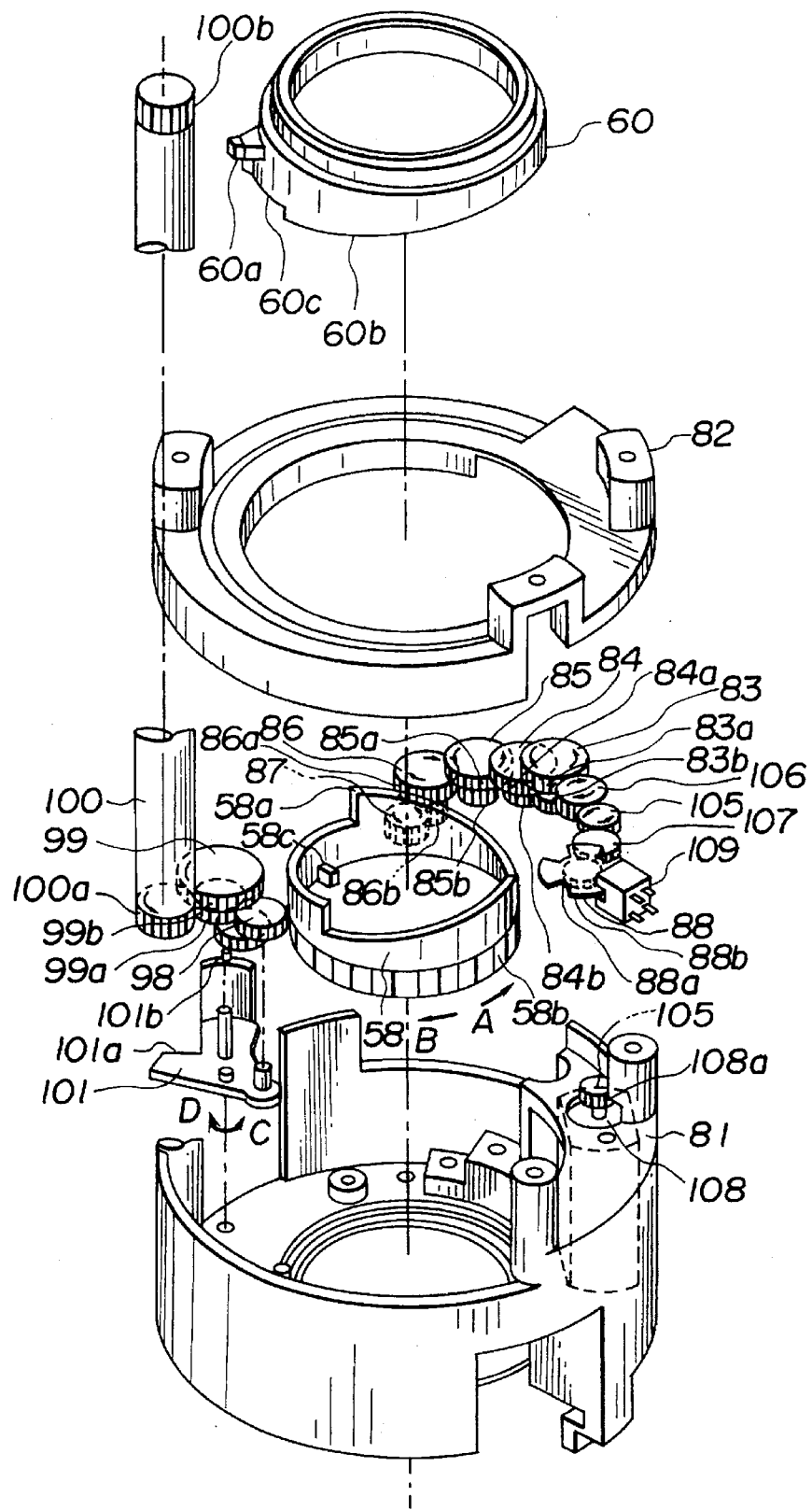
FIG. 12 is an exploded perspective view of a principal portion, showing a connecting portion between a focal drive unit and a barrier drive gear, in the lens mount according to the first embodiment.
Figure 13:
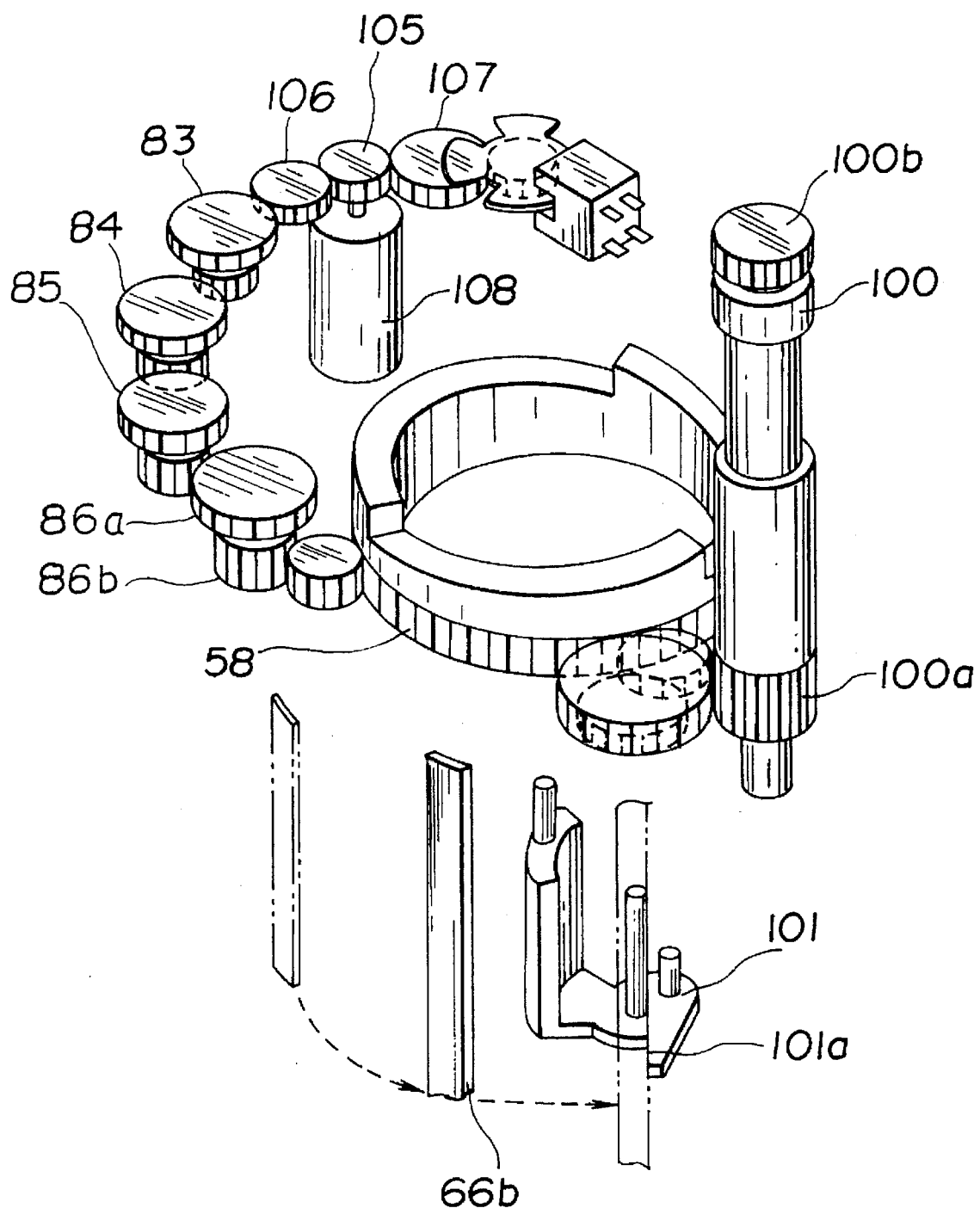
FIG. 13 is an exploded perspective view viewing a principal portion of the connecting portion between the focal drive unit and the barrier drive gear from another angle, in the lens mount according to the first embodiment.

FIGS. 12 and 13 are exploded perspective views showing an arrangement of the focus drive mechanism according to the embodiment.

As shown in FIGS. 12 and 13, a focus motor 108 is fixedly mounted on the shutter bottom plate 81. The focus motor 108 has an output shaft 108a thereof on which a pinion gear 105 is fixedly mounted. An idle gear 106 which is supported on a pivot on the shutter bottom plate 81 for angular movement is in mesh with the pinion gear 105. Further, an idle gear 107 which is supported on a pivot on the shutter bottom plate 81 for angular movement is in mesh with the pinion gear 105.

Moreover, gears 83, 84, 85 and 86 are two-step gears for deceleration or reduction in speed and are supported on respective pivots on the shutter bottom plate 81 for axial movement. Furthermore, a gear 87 is an idle gear, and is in mesh with a small diameter gear portion 86b of the gear 86, a focus cam 58a and a gear portion 58b.

In case where focusing is performed, a drive power source is supplied to the focus motor 108 from the side of the camera body. Thus, the focus cam ring 58 is moved angularly. The third lens group frame 55 is regulated in angular movement thereof by a rod 89 and the linear key 55a, and is linearly moved in the optical-axis left-hand direction. At this time, since the second lens group frame 54 is also engaged with the linear key groove in the front frame 60, the second lens group frame 54 is moved linearly in the optical-axis left-hand direction through the amount of movement the same as that of the third lens group frame 55 without being angularly moved.

Thus, the second lens group frame 54 and the third lens group frame 55 are moved in unison with each other in the optical-axis direction only through focal adjustment, which is determined by the zoom operation, without the spacing therebetween being changed, and is changed from the state illustrated in FIG. 1 to a state illustrated in FIG. 3.

A gear 88 is supported on a pivot on the shutter bottom plate 81 for angular movement, and is provided with a slit blade portion 88b. The slit blade portion 88b is counted by the focus photo interrupter 109, whereby the number of revolutions of the motor is detected. Specifically, pulses of the focus photo interrupter 109 are counted whereby it is possible to know the rotational angle of the focus cam ring 58, that is, the feeding amounts of the respective second and third lens group frames 54 and 55.

Gear 98 and two-step gear 99 are both supported in pivot on the barrier drive changing-over lever 101 for angular movement. Further, the barrier drive gear 100 is supported on a pivot on the shutter bottom plate 81 for angular movement. A gear portion 100a at one end of the barrier drive gear 100 is in mesh with a large diameter gear portion 99b of the two-step gear 99. The barrier drive gear portion 100b at the other end of the barrier drive gear 100 is in mesh with the internal gear 69a of the barrier drive ring 69.

A barrier drive changing-over lever 101 is supported in pivot on the shutter bottom plate 81 for angular movement. One end 101a of the drive changing-over lever 101 is urged against the interlocking plate 66. The barrier drive changing-over lever 101 is movable between a position where the gear 98 is in mesh with the gear portion 58b of the focus cam ring 58 and a position where a pin 101b is urged against the cam portion 60B of the front frame 60 so that a gear 98 is not in mesh with the gear portion 58b of the focus cam ring 58.

Operation of the above-described focus drive mechanism will next be described.

Figure 25:
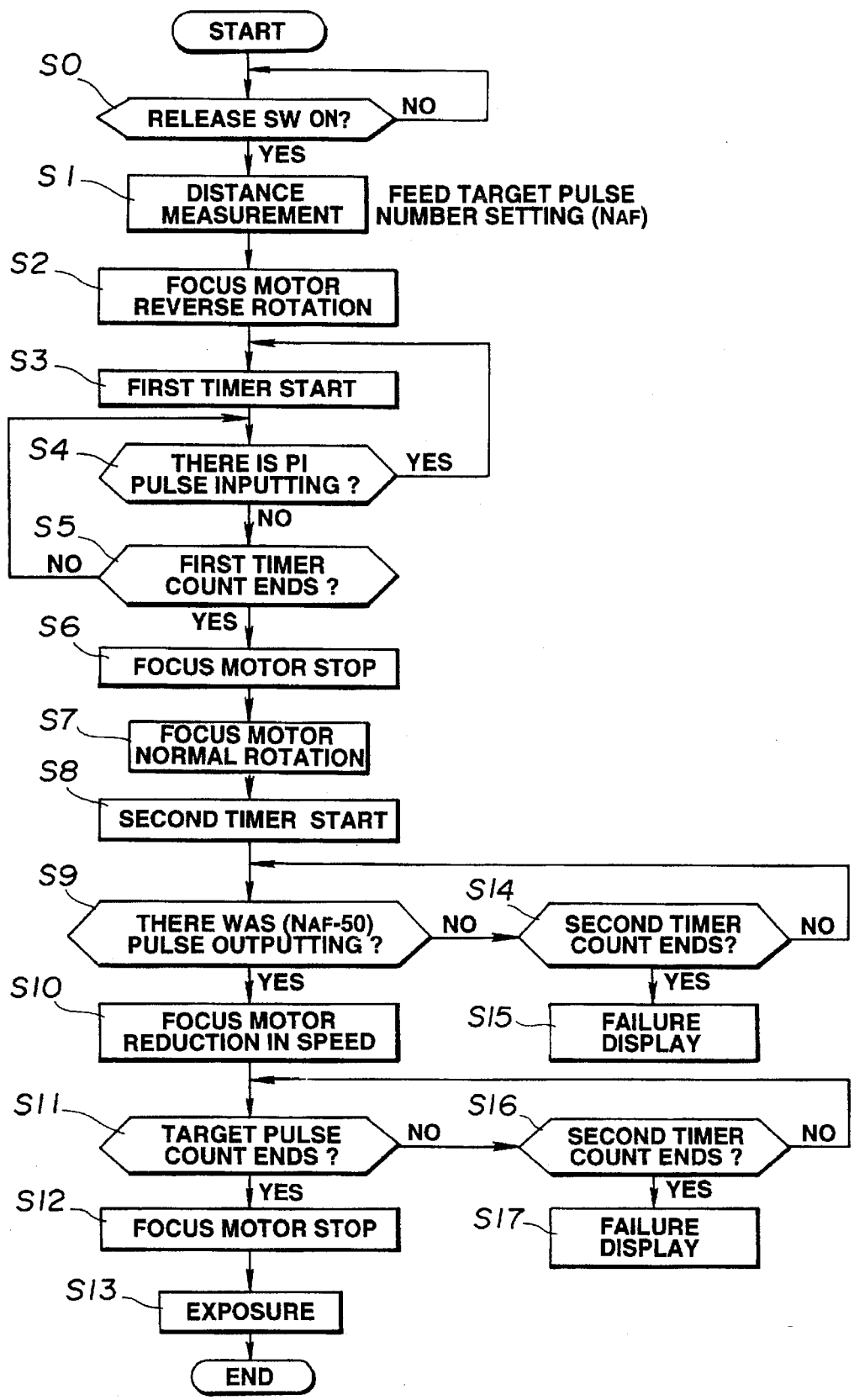
FIG. 25 is a flow chart showing operation of a focus drive mechanism in the lens mount according to the first embodiment.

FIG. 25 is a flow chart showing operation of the focus drive mechanism in the lens mount according to the present embodiment. Operation of the mechanism will hereunder be described with reference to the flow chart, and FIG. 12 and 13.

First, when the release SW 318 (refer to FIG. 24) is turned ON (Step S0), distance measurement is performed by an auto focus sensor (not shown) (Step S1). At this time the feeding amounts of the second group of lenses 142 and the third group of lenses 143 upon the focusing operation are found by operation or computation. The target number of feeding pulses NAF is found from the computed feeding amounts.

Subsequently, the focus motor 108 is reversely rotated to perform lens resetting operation (Step S2). Specifically, when the focus motor 108 is reversely rotated, the focus cam ring 58 is rotated in the direction indicated by A in FIG. 12. Thus, the stopper 58c of the focus cam ring 58 is abutted against the stopper 81d of the shutter bottom plate 81 and stops.

Simultaneously with the reverse rotation of the focus motor 108, the first timer starts (Step S3), and the first timer is reset every time that the pulse input signal is received from the photo interrupter (PI) 109 (Step S4). By end or termination of count of the first timer (Step S5), it is judged as being an end of resetting operation, and the focus motor 108 stops (Step S6).

Subsequently, the focus motor 108 is normally rotated i.e. rotated in the normal direction, (Step S7) and, simultaneously therewith, the second timer starts (Step S8). Thus, the focus cam ring 58 is rotated in a direction indicated by an arrow B in FIG. 12. At this time, pulse signals from the photo interrupter 109 are monitored. The focus motor 108 is reduced in speed or is decelerated from the point of time the number of pulses reaches the feeding target pulse number NAF - 50 (Step S9, Step S10). At the time the number of pulses from the photo interrupter 109 reaches the target pulse number NAF, the focus motor 108 stops (Step S11, Step S12).

As a result, the second group of lenses 142 and the third group of lenses 143 are fed in accordance with the distance from the subject, and the focusing operation ends. Subsequently, the shutter operates so that exposure is performed (Step S13).

Meanwhile, as described above, when the focus motor 108 is normally rotated, the second timer which has a time longer than the focusing operation starts (Step S8). In case where count of the second timer ends prior to the fact that count of the target pulse number NAF ends (Step S14. Step S16), it is judged that the camera is out of order so that display of fault is performed on the display device 307 of the camera (Step S15, Step S17).

The lens barrier drive changing-over mechanism in the lens mount according to the present embodiment will next be described with reference to FIG. 12 to FIG. 15.

Figure 14:
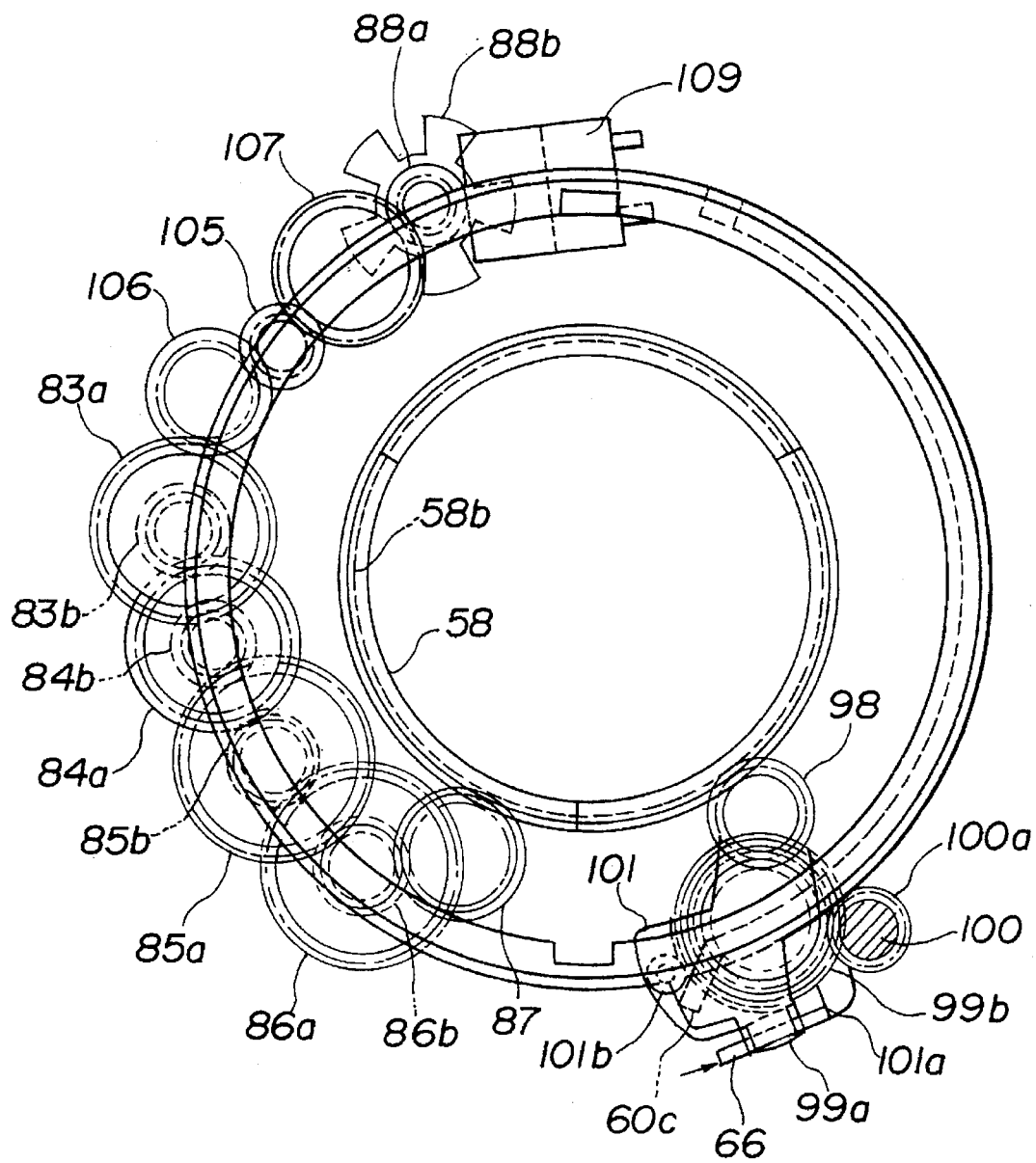
FIG. 14 is an explanatory view showing a transmitting state of a lens barrier drive change-over mechanism to a barrier drive system, in the lens mount according to the first embodiment.

FIG. 14 is an explanatory view showing a transmitting state to the barrier drive system of the lens barrier drive changing-over mechanism. Moreover, FIG. 15 is an explanatory view showing a non-transmitting state to the barrier drive system of the lens barrier drive changing-over mechanism.

The barrier drive changing-over lever 101 is supported by a pivot on the shutter bottom plate 81 for angular or swinging movement. Furthermore, the gear 98 and the two-step gear 99 are supported by pivots on shafts, respectively, for angular movement, which are fixedly mounted in planting, on the barrier drive changing-over lever 101. Meanwhile, the barrier drive gear 100 is supported by a pivot on the shutter bottom plate 81 for angular movement. The gear 100a which is formed on one end of the barrier drive gear 100 and the gear 99b of the two-step gear 99 are in mesh with each other. Further, the gear 99a of the two-step gear 99 is in mesh with the gear 98.

Figure 15:
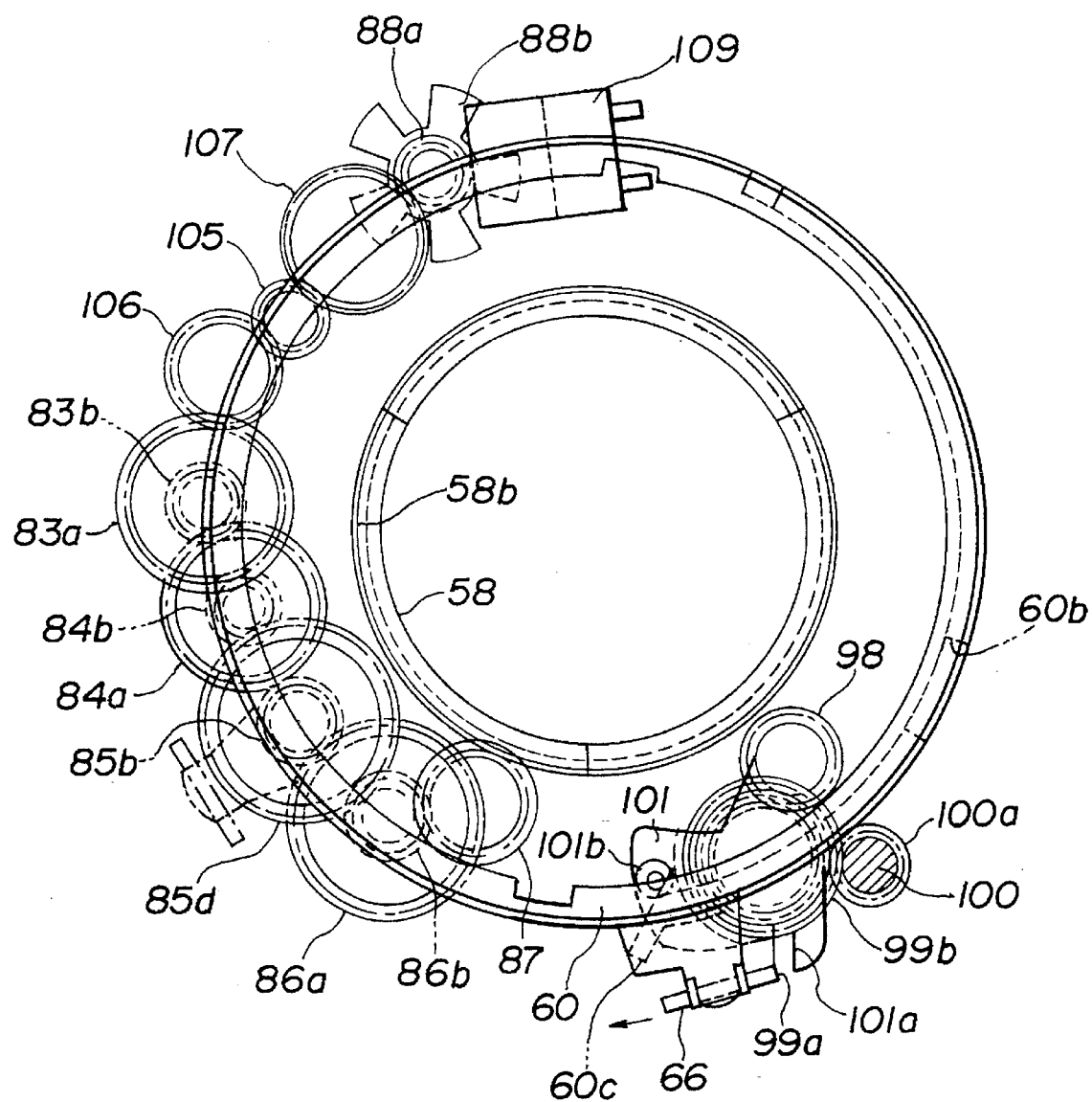
FIG. 15 is an explanatory view showing a non-transmitting state of the lens barrier drive change-over mechanism to the barrier drive system, in the lens mount according to the first embodiment.

The barrier drive changing-over lever 101 has one end 101a thereof which is swingable between a position where the one end 101a is urged against the end face of the interlocking plate 66 (refer to FIG. 1) upon lens collapsible mount so that the gear 98 is in mesh with the gear portion 58b of the focus cam ring 58 (refer to FIG. 14), and a position where the pin portion 101b is urged against the cam portion 60c of the front frame 60 so that the gear 198 is not in mesh with the gear 58b (refer to FIG. 15).

Figure 18:
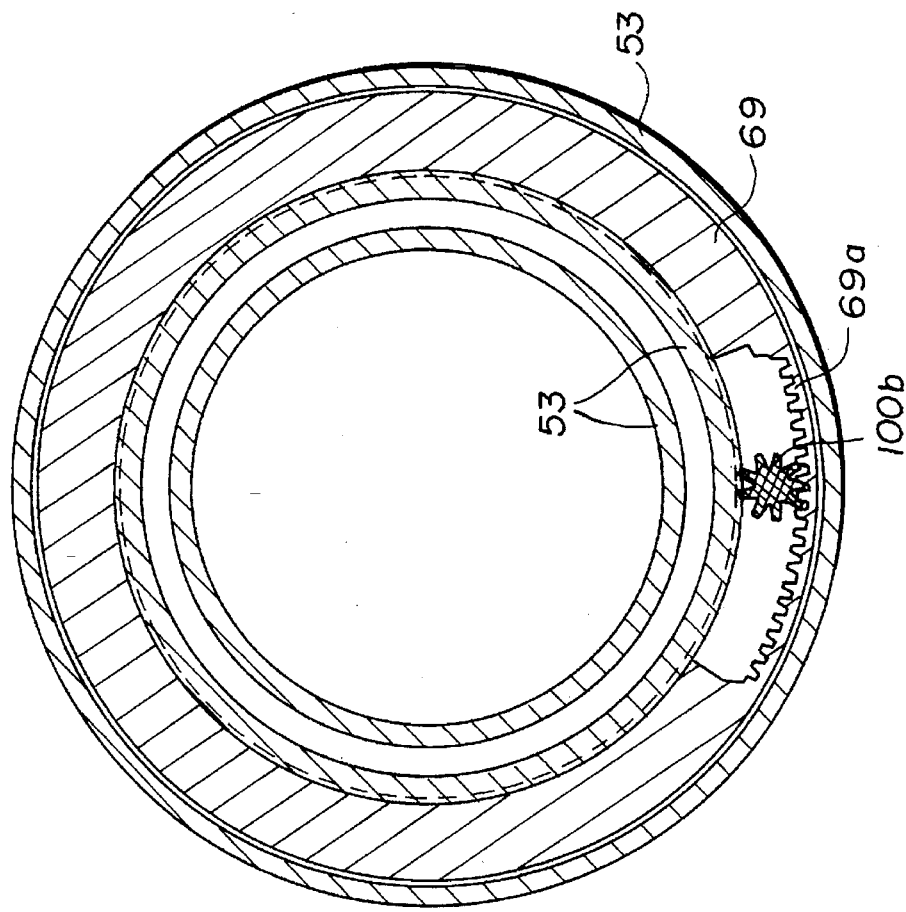
FIG. 18 is a longitudinal cross-sectional view and FIGS. 18A and 18B are a transverse cross-sectional views showing a barrier drive ring and a barrier drive gear in the lens mount according to the first embodiment.
Figure 18A:
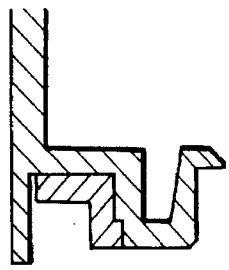
Figure 18B:
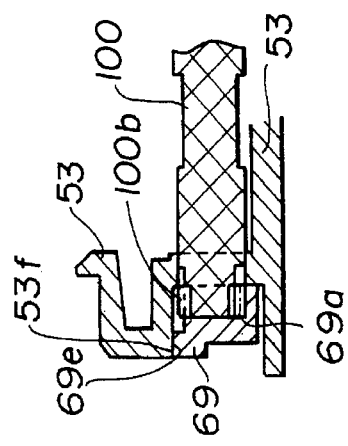

Moreover, in FIGS. 16, 17 and 18, the barrier drive ring 69 is fitted on the forward end 53f of the first lens group frame 53 for angular movement. The barrier drive ring 69 has an inner diameter portion thereof which is provided with the internal gear 69a which is in mesh with the gear portion 100b which is formed on the other end of the barrier drive gear 100.

Moreover, the barrier spring 70 is fixedly mounted on the barrier drive ring 69. Thus, the barrier blade 71 is adapted to be urged. The barrier blade 71 is mounted on the first lens group frame 53 for swinging movement around a swinging-movement center that is the boss 53d which is arranged at the forward end of the first lens group frame 53. The barrier blade 71 is formed with projections 71c which are biased by the barrier spring 70, the projection 71a for driving the barrier blade 73 toward closed state, and a recess 71b for biasing the projection 73b of the barrier blade 73 toward the open state.

The barrier blade 73 is mounted on the first lens group frame 53 for angular movement around a swinging center that is the boss 53d at the forward end of the first lens group frame 53, similarly to the barrier blade 71. Upon the barrier closed state, the barrier blade 73 is biased by the projection 71a of the barrier blade 71, and upon the open state, the projection 73b is driven by the barrier blade 71, to perform opening and closing operation. Further, a cover ring 74 is mounted on the forward end of the first lens group frame 53, to regulate the positions of the barrier drive ring 69, the barrier blade 71 and the barrier blade 73 in the optical-axis direction.

Operation of the lens barrier drive mechanism will next be described.

First, when the power SW is turned OFF, a power source is supplied to a zoom drive unit (not shown) so that the zoom motor 201 (FIG. 24) is rotated. Thus, the rotary frame 51 is rotated in the counterclockwise direction. Moreover, the first lens group frame 53 is moved to the collapsible mount position. At this time, the middle frame 59 is also moved to the collapsible mount position by the movement of the first lens group frame 53. Furthermore, by the interlocking plate 66 which is rotated integrally with the middle frame 59, one end 101a of the barrier drive changing-over lever 101 is urged. The barrier drive changing-over lever 101 is swung (in the direction indicated by the arrow-C in FIG. 12) so that the gear 98 and the gear 58b are in mesh with each other (refer to FIG. 14). Specifically, power of the focus motor 108 is transmitted to the barrier drive gear 100.

The power source is next supplied to the focus motor 108. By the fact that the focus motor 108 is rotated in the counterclockwise direction, the power is transmitted to the barrier drive gear 100 through a gear train so that the barrier drive gear 100 is rotated in the counterclockwise direction. Thus, by the fact that the gear 100b arranged on the one end of the barrier drive gear 100 and the internal gear 69a are in mesh with each other, the barrier drive ring 69 is rotated in the counterclockwise direction. At this time, the barrier blade 71 is urged by the barrier spring 70 so that the barrier blade 71 is swung in a barrier closed direction. Meanwhile, the barrier blade 73 is urged against the projection 71a on the barrier blade 71, and is likewise swung in the barrier closed direction. At this time, the pulse signals from the photo interrupter 109 are counted, and the motor stops at the time it is detected that the focus motor 108 is rotated through the predetermined pulse number required for barrier closing.

Barrier opening operation will next be described.

When the power SW is turned ON, the power source is first supplied to the focus motor 108 to rotate the focus motor 108 in the clockwise direction. Thus, the power of the focus motor 108 is transmitted so that the barrier drive ring 69 is rotated in the clockwise direction. Further, the projection 71b of the barrier blade 71 is urged against the barrier spring 70 so that the barrier blade 71 is moved in the open direction. Meanwhile, the projection 73b is urged against the barrier blade 71 so that the barrier blade 73 is likewise moved in the open direction. At this time, similarly to the time of the above-described closure, the pulse signals from the photo interrupter 109 are counted. The motor stops at the time it is detected that the focus motor 108 is rotated only through a predetermined number of pulses.

The power source is next supplied to the zoom drive unit (not shown) so that the zoom motor 201 is rotated. Thus, the rotary frame 51 is rotated in the clockwise direction. As a result, the first lens group frame 53 is moved to a photographable position. Furthermore, the middle frame 59 is rotated in keeping with the movement of the first lens group frame 53. Specifically, the front frame 60 is rotated through the interlocking plate 66.

At this time, since the cam portion 60c of the front frame 60 urges the pin 101b of the barrier drive changing-over lever 101, the barrier drive changing-over lever 101 is swung to a position where the gear 98 and the gear 58b are not in mesh with each other (refer to FIG. 15). As a result, transmission between the barrier drive gear 100 and the focus motor 108 is cut off. Thus, normal photographing is made possible.

According to the above-described first embodiment, it is possible to provide the lens mount of the structure in which, in the optical system for the zoom lens which has a plurality of groups of lenses which change spacing therebetween upon the zoom operation, and which are fed integrally upon the focusing operation, the positions of the groups of lenses which are fed upon the focusing operation are maintained at high accuracy and the size in the radial direction is restrained to be extremely low.

Specifically, the change of the group spacing due to the zooming of the focusing optical system is realized by the arrangement in which the end face cam is provided on any one of the lens frame which is angularly moved upon the zoom operation and the lens frame which is retained so as to be capable of moving linearly in the optical-axis direction, and the cam follower is provided on the other, whereby it is possible to realize a lens mount which is compact as a whole in which an increase of a size in the radial direction is restrained, the lens mount can be packed in the extremely reduced space because the drive force upon zoom operation is transmitted to the focusing group by the thin-plate like connecting element and, as a result, the other elements or the like can effectively be arranged in a blank space.

Moreover, due to the fact that the cam frame which transmits the zooming drive force to the plurality of lens mounts uses an extremely small amount of simple elements, the lens mounts can be retained easily and highly accurately. Thus, it is possible to provide a lens mount of a small size at a low cost.

Furthermore, according to the aforementioned first embodiment, since the connecting portion between the internal gear and the barrier drive gear becomes schematically a closed state, it is possible to prevent powder dust or dirt or the like from entering this portion. Thus, it is possible to prevent operational malfunction or failure or the like which is generated by the fact that dust or dirt and sand are adhered to the gear surfaces of the gears or the like and are put between the gears.

Further, angular movement and fitting of the barrier drive ring is performed by inner-diameter portions, whereby a space can be provided between the lower surface of the camera, of the outer peripheral portion on which the dust or dirt or the like is liable to be accumulated and the angular moving element. Thus, even if the dust or dirt or the like is accumulated on this portion, no influence is exerted upon operation of the angular moving element. It is possible to prevent operational failure or malfunction.

Further, since a forward end surface adjacent to the angular movement fitting portion between the barrier drive ring and the lens mount are substantially in the same surface or are coplanar to each other, the dust or dirt or the like is difficult to be accumulated on the mouth of the angular movement fitting portion. Thus, it is possible to prevent operational failure or malfunction due to the fact that the dust or dirt enters the fitting portion.

Moreover, according to the above-described embodiment it is possible to prevent the light ray from shading by the fact that the flexible printed circuit board arranged within the lens mount extrudes into the effective light flux by less number of parts, and it is possible to prevent operational failure or malfunction due to the fact that the flexible printed circuit board interferes with the movable element, and is put into the gap or the like between the lens frames.

Furthermore, according to the aforesaid embodiment, the lenses of the forward group of the zoom lenses are fixed whereby sealing treatment or processing for making the lens frame drip proof is sufficient to be performed only to the telescoped or expanded portions upon zoom. Thus, the waterproof structure of the lens frame can be simplified.

Further, since no abundant or excessive load due to the sealing treatment is applied to the focus drive system, it is possible to compact the focus drive system. Thus, control at high accuracy is made possible.

Moreover, if a comparison is made with a case where a cover glass is provided in front of the lens mount, it is not required or unnecessary to secure the moving space for the focus lens in the optical-axis direction. Accordingly, it is possible to realize a lens mount which is shorter in overall length. Thus, it is possible to provide the zoom lens mount which is of drip proof structure and which is small in size.

A lens mount according to a second embodiment of the invention will next be described.

The second embodiment is different from the first embodiment only in the drive mechanism for the FPC guide, and the other arrangements and functions are similar to those of the first embodiment. Accordingly, only different points will be described here.

Figure 27:
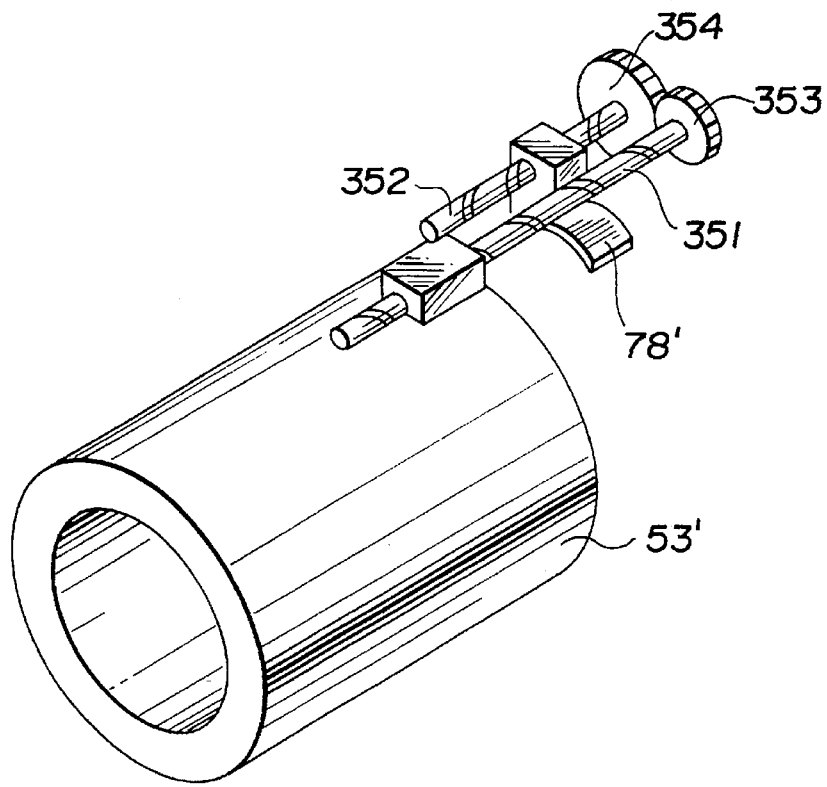
FIG. 27 is a perspective view of a principal portion, showing a first lens group frame and a mechanism for driving the FPC guide in a lens mount according to a second embodiment of the invention.
Figure 28:
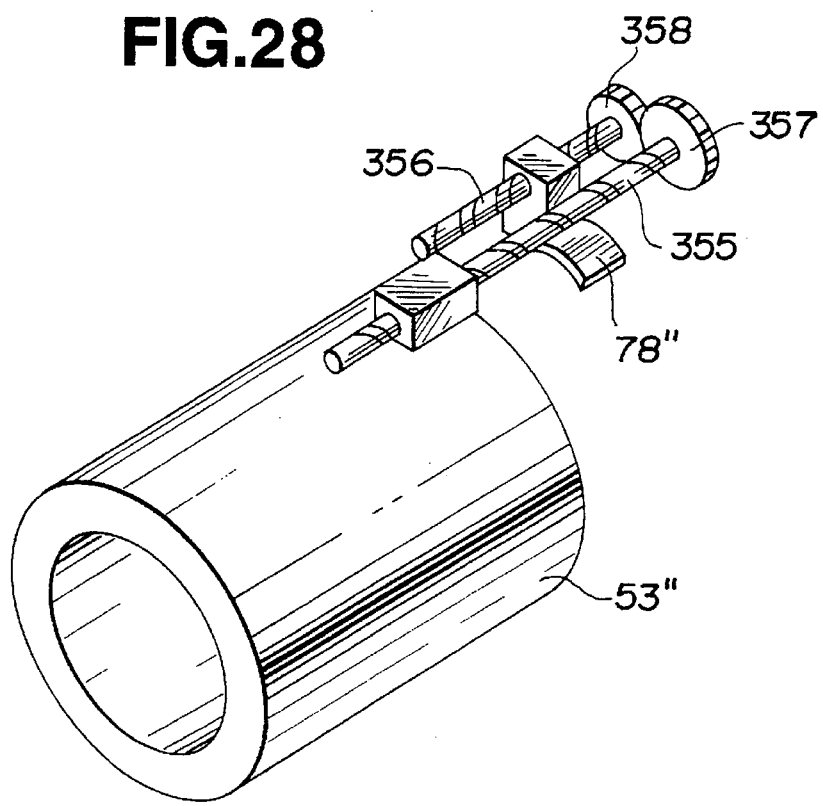
FIG. 28 is a perspective view of a principal portion, showing a first lens group frame and a mechanism for driving an FPC guide in a lens mount according to a modification of the second embodiment.

FIGS. 27 and 28 are perspective views of a principal portion showing a drive mechanism for an FPC guide and a first lens group frame in the lens mount according to the second embodiment.

As shown in FIG. 27, the second embodiment is arranged such that a first lens group frame 53' and an FPC guide 78' are driven by the use of lead screws 351 and 352 which are reverse in phase and which are the same in lead (i.e. pitch) as each other. The reduction gear ratio of gears 353 and 354 becomes about 2:1, to thereby realize a feeding mechanism. Furthermore, FIG. 28 shows a modification of the second embodiment. In the modification, the reduction gear ratio of gears 357 and 358 is made to 1:1, and lead of lead screws 355 and 356 of a reverse phase is made to about 2:1, whereby the feeding mechanism can be realized.

Also in the second embodiment arranged as described above, advantages similar to those of the first embodiment can be expected.

A lens mount according to a third embodiment of the invention will next be described.

The third embodiment is different from the first embodiment only in the lens barrier drive changing-over mechanism. The other arrangement and function are similar to those of the first embodiment. Accordingly, only differences will be described here.

Figure 29:
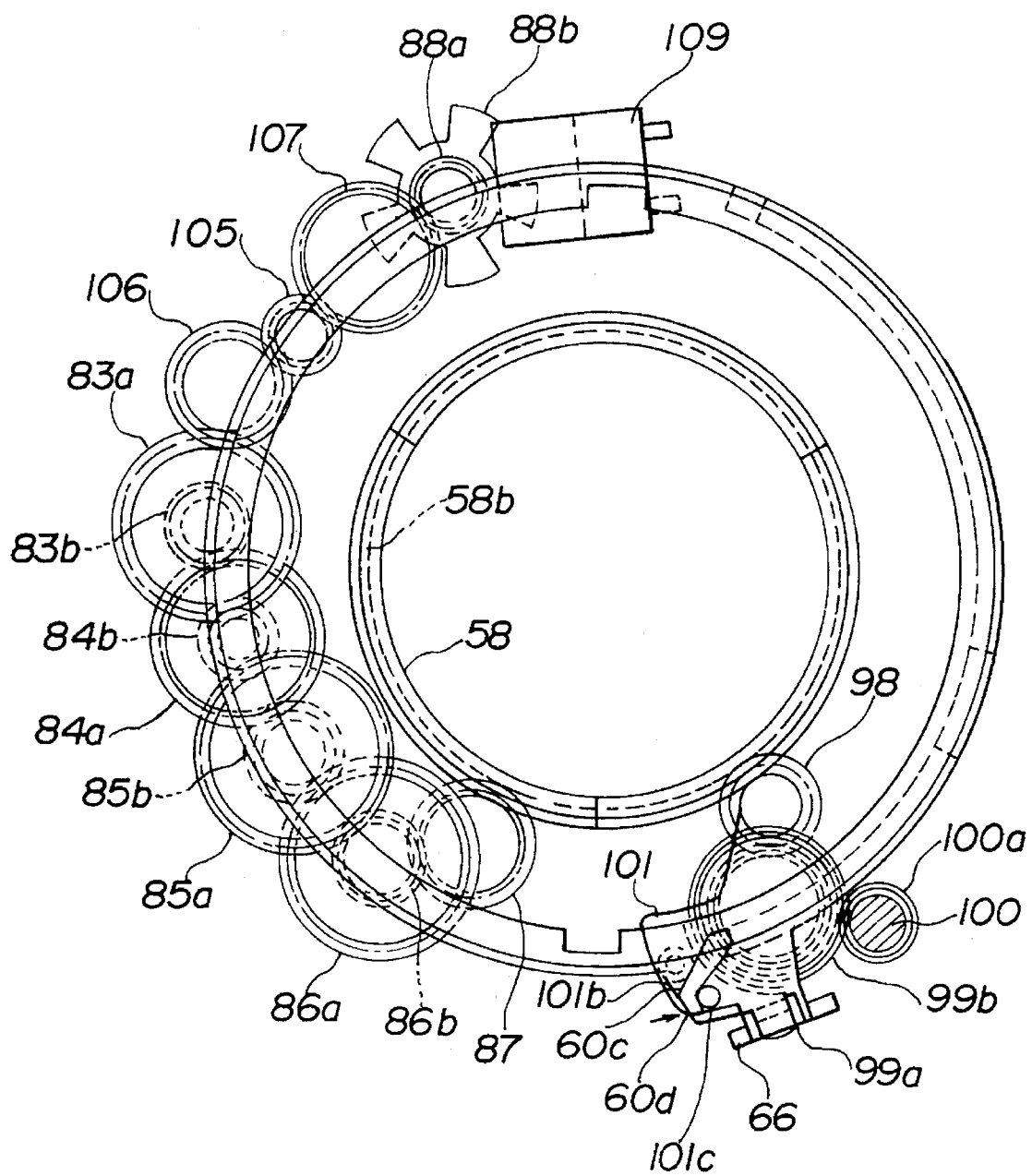
FIG. 29 is an explanatory view showing a lens-barrier drive change-over mechanism in a lens mount according to a third embodiment of the invention.

FIG. 29 is a view showing a lens barrier drive changing-over mechanism in the lens mount according to the third embodiment.

In the first embodiment, the barrier drive changing-over lever 101 is urged by the interlocking plate 66 into the direction in which the gear 98 and the gear 58b are in mesh with each other. In the third embodiment, however, as shown in FIG. 29, a pin 101c of a barrier drive changing-over lever 101 is urged by a rib 60a which is formed in protrusion by a cam portion 60c of a front frame 60.

Also in the third embodiment arranged as described above advantages similar to those of the first embodiment can be expected.

As described above, according to the various embodiments, it is possible to provide the lens mount which is reduced in the size or dimension in the radial direction.

Moreover, it is possible to provide a lens mount which prevents operational failure or malfunction which occurs due to dust or dirt and sand or the like which enter from the outside.

Furthermore, it is possible to provide the lens mount which has the mechanism which is secured to guide the flexible printed circuit board by the lesser number of parts.

In this invention, it is apparent that working modes different in a wide range can be formed on the basis of this invention without departing from the spirit and scope of the invention. This invention is not restricted by any specific embodiment except as may be limited by the appended claims.

What is claimed is:

1. A zoom lens mount comprising:

a plurality of groups of lenses which cooperate with each other to form a photographing optical system;

a fixed frame;

an angular movement frame angularly moved around an optical axis with respect said fixed frame upon a zoom operation;

a first moving frame regulated in angular movement around the optical axis with respect to said fixed frame and retractable in an optical-axis direction with respect to said fixed frame by an angular moving operation of said angular movement frame;

a second moving frame provided integrally with said first moving frame in the optical-axis direction for angular movement around the optical axis, said second moving frame being engaged by cam means provided on said fixed frame, said second moving frame being retractable in the optical-axis direction together with said first moving frame responsive to retraction of said first moving frame in the optical-axis direction and being angularly moved around the optical axis with respect to said first moving frame;

a first lens retaining frame provided integrally around the optical axis with respect to said second moving frame and retractable in the optical-axis direction for retaining one of said plurality of groups of lenses;

a second lens retaining frame provided integrally around the optical axis with respect to said first moving frame and retractable in the optical-axis direction, for retaining a group of lenses different from the group of lenses which is retained by said first lens retaining frame, of said plurality of groups of lenses;

biasing means for applying a biasing force such that said first lens retaining frame and said second lens retaining frame are abutted against each other;

end-face cam means provided on end faces in the optical-axis direction which are abutted against each other, of said first lens retaining frame and said second lens retaining frame, for adjusting a separation distance in the optical-axis direction between them, by the angular movement of said first lens retaining frame with respect to said second lens retaining frame; and a focus element angularly moved with respect to said first lens retaining frame upon focusing operation, and integrally retracting said second lens retaining frame and said first lens retaining frame in the optical-axis direction through said end-face cam means to perform a focusing operation.

2. A zoom lens mount according to claim 1, wherein said first moving frame is regulated in angular movement around the optical axis with respect to said fixed frame by a linear guide of said fixed frame, and is coupled by a cam to said angular movement frame to thereby be retracted in the optical-axis direction with respect to said fixed frame responsive to angular movement of said angular movement frame.

3. A zoom lens mount according to claim 1, wherein said second moving frame includes a first frame element retained integrally with respect to said first moving frame in the optical-axis direction at a rearward portion of said first moving frame so as to be cam-coupled to said fixed frame, a second frame element with which said first lens retaining frame is engaged integrally around the optical axis and in a retractable manner in the optical-axis direction, and a connecting element extending along the optical-axis direction for integrally connecting said first frame element and said second frame element to each other around the optical axis and in the optical-axis direction.

4. A zoom lens mount according to claim 3, wherein said second frame element is retained integrally in the optical-axis direction for angular movement around the optical axis with respect to said first moving frame.

5. A zoom lens mount according to claim 3, wherein in said biasing means is arranged between said second frame element and said first lens retaining frame.

6. A zoom lens mount according to claim 3, wherein said second frame element and said first lens retaining frame are connected to each other at a plurality of locations around the optical axis.

7. A zoom lens mount according to claim 1, wherein said focus element has a frame element having an end-face cam, which is abutted against an end face of said second lens retaining frame, opposite to an end face thereof to which said first lens retaining frame, opposite to an end face thereof to which said first lens retaining frame is abutted, wherein said frame element is angularly moved whereby said second lens retaining frame and said first lens retaining frame are integrally retracted together in the optical-axis direction.

8. A zoom lens mount comprising:

a plurality of groups of lenses;

an angular movement frame angularly moved by a first drive source around an optical axis with respect to a fixed frame upon a zoom operation;

a first moving frame retracted by angular movement of said angular movement frame in an optical-axis direction with respect to said fixed frame;

a second moving frame provided integrally with said first moving frame in the optical-axis direction for angular movement around the optical axis, said second moving frame being retractable in the optical-axis direction together with said first moving frame responsive to retraction of said first moving frame in the optical-axis direction, and being angularly moved around the optical-axis with respect to said first moving frame;

a first lens retaining frame provided integrally around the optical axis with respect to said second moving frame and retractable in the optical-axis direction for retaining one of said plurality of groups of lenses;

a second lens retaining frame provided integrally around the optical axis with respect to said first moving frame and retractable in the optical-axis direction, for retaining another group of lenses of said plurality of groups of lenses, said second retaining frame being cam-coupled to said first lens retaining frame, said second lens retaining frame being angularly moved by relative angular movement between said first moving frame and said second moving frame with respect to said first lens retaining frame, to adjust spacing with respect to said first lens retaining frame; and a focus element cam-coupled to said second lens retaining frame and angularly moved by a drive source with respect to said second lens retaining frame upon focusing operation, and integrally retracting said first lens retaining frame, and said second lens retaining frame together in the optical-axis direction.

9. A zoom lens mount comprising:

two groups of lenses integrally moved in an optical-axis direction while spacing therebetween in the optical-axis direction is modified when a zoom operation is performed, and spacing therebetween in the optical-axis direction is fixed when a focusing operation is performed;

a first lens frame formed with an end-face cam on an end face thereof extending in the optical-axis direction in which a length of said first lens frame projecting along a circumferential direction and in the optical-axis direction is changed, said first lens frame retaining one of said two groups of lenses;

a second lens frame having a cam follower abutted against said end-face cam for retaining another one of said two groups of lenses;

biasing means for biasing said first lens frame and said second lens frame in a direction approaching each other;

angular-movement regulating means for regulating angular movement of one of said first lens frame and said second lens frame around the optical axis; and drive means for angularly moving the other lens frame of said first lens frame and said second lens frame around the optical axis upon zoom operation, to modify spacing between said first lens frame and said second lens frame by said end-face cam and said cam follower.

10. A zoom lens mount according to claim 9, wherein said two groups of lenses are a part of a plurality of groups of lenses which form a photographing optical system which is provided within the zoom lens mount.

11. A zoom lens mount according to claim 9, wherein one of said first lens frame and said second lens frame is retracted toward the other lens frame whereby said first lens frame and said second lens frame are retracted in the optical-axis direction to perform a focusing operation.

12. A zoom lens mount comprising:

a plurality of groups of lenses forming a photographing optical system;

a first lens frame for retaining one of said plurality of groups of lenses and formed with an end-face cam on an end face thereof extending in an optical-axis direction in which a length of said first lens frame in the optical-axis direction is changed along a circumferential direction;

a second lens frame for retaining another one of the group of lenses of said plurality of groups of lenses, which is different from the group of lenses which is retained on said first lens frame, and having a cam follower abutted against said end-face cam;

biasing means for biasing said first lens frame and said second lens frame in a direction approaching each other;

angular-movement regulating means for regulating angular movement of one of said first lens frame and said second lens frame around the optical axis; and angular movement means for angularly moving the other lens frame of said first lens frame and said second lens frame around the optical axis upon zoom operation, to modify spacing between said first lens frame and said second lens frame by said end-face cam and said cam follower.

13. A zoom lens mount according to claim 12, wherein said angular movement means includes an angular movement frame angularly moved around the optical axis by zoom operation, and an interlocking plate for connecting said angular movement frame and the other lens frame of said first lens frame and said second lens frame to each other.

14. A lens mount comprising:

a first lens frame for retaining one of a plurality of groups of lenses of a photographing optical system and formed with an end-face cam on an end face thereof extending in an optical-axis direction in which a length of said first lens frame in the optical-axis direction is changed along a circumferential direction;

a second lens frame for retaining another group of lenses of said plurality of groups of lenses, and having a cam follower which is abutted against said end-face cam;

biasing means for biasing said second lens frame toward said first lens frame;

angular-movement regulating means for regulating angular movement of one of said first lens frame and said second lens frame around an optical axis;

first drive means for retracting said one of said first lens frame and second lens frame in the optical-axis direction to thereby integrally retract said first lens frame and said second lens frame in the optical-axis direction; and second drive means for angularly moving the other lens frame of said first lens frame and said second lens frame around the optical axis, to modify spacing between said first lens frame and said second lens frame by said end-face cam and said cam follower.

15. A lens mount according to claim 14, wherein said first drive means has a third lens frame provided with an end-face cam on an end face of said first drive means in which a length of said third lens frame in the optical-axis direction is changed along a circumferential direction, wherein said one lens frame is provided with a cam follower abutted against an end-face cam of said third lens frame, and wherein said third lens frame is driven in angular movement, whereby said first lens frame and said second lens frame are integrally retracted in the optical-axis direction.

16. A lens mount according to claim 14, wherein said first drive means drives said third lens frame when a focusing operation is performed.

17. A lens mount according to claim 14, wherein said second drive means angularly moves the other lens frame of said first lens frame and said second lens frame around the optical axis when focal-distance modifying operation is performed.

18. A lens mount comprising:

a first lens frame;

an end-face cam provided on an end face of said first lens frame in which a length in an optical-axis direction is changed along a circumferential direction;

a second lens frame having a cam follower abutted against said end-face cam;

biasing means for biasing said first lens frame and said second lens frame in a direction approaching each other;

angular-movement regulating means for regulating angular movement of one of said first lens frame and said second lens frame around an optical axis; and drive means for angularly moving another one of said first lens frame and said second lens frame around the optical axis to modify spacing between said first lens frame and said second lens frame by said end-face cam and said cam follower.

19. A lens mount according to claim 18, wherein a spacing between said first lens frame and said second lens frame is modified whereby a focal length of a photographing system within said lens mount is modified.

20. A lens mount comprising:

a first lens frame;

an end-face cam provided on an end face of said first lens frame in which a length in an optical-axis direction is changed along a circumferential direction;

a second lens frame having a cam follower abutted against said end-face cam;

biasing means for biasing said second lens frame toward said first lens frame;

angular-movement regulating means for regulating angular movement of said first lens frame around an optical axis;

first drive means for retracting said first lens frame in the optical-axis direction to thereby retract both said first lens frame and said second lens frame in the optical-axis direction; and second drive means for angularly moving said second lens frame around the optical axis, to modify spacing between said first lens frame and said second lens frame by said end-face cam and said cam follower.

21. A lens mount according to claim 20, wherein said first drive means has a third lens frame provided with an end-face cam on an end face of said first drive means in which a length of said third lens frame in the optical-axis direction is changed along a circumferential direction, wherein said one lens frame is provided with a cam follower which is abutted against an end-face cam of said third lens frame, and wherein said third lens frame is driven in angular movement, whereby said first lens frame and said second lens frame are integrally retracted in the optical-axis direction.

22. A zoom lens including a plurality of groups of lenses, said zoom lens comprising:

an optical system for zooming and including a pair of groups of lenses which contribute to focal adjustment;

lens-spacing modifying means for modifying relative spacing between said pair of groups of lenses in an optical-axis direction;

lens angular-movement means for angularly moving one of said pair of groups of lenses around an optical axis in keeping with modification of a focal length to modify the relative spacing of said pair of groups of lenses in the optical-axis direction by an action of said lens-spacing modifying means; and focusing means for retaining relative spacing between said pair of groups of lenses constant by said lens-spacing modifying means, to integrally move said pair of groups of lenses in the optical-axis direction.

23. A zoom lens comprising:

a moving frame having an optical system of said zoom lens;

a pair of lens barrier means for covering a front surface of a photographing lens and provided on a front portion of said moving frame;

drive ring means for performing opening and closing of said lens barrier means when said drive ring means is angularly moved around an optical axis of the optical system, and having an open bore for causing a photographing light to pass through a center of said drive ring means, a flange provided on a periphery of said open bore, and a portion extended rearwardly of said optical axis continuously in said flange; and a drive shaft engaged with said drive ring means for angularly moving said drive ring means, wherein said moving frame further has a fitting portion which retains said drive ring means for angular movement at a location in a vicinity of the open bore in said drive ring means, and wherein said drive shaft is arranged within a space which is covered by said fitting portion and the portion extended rearwardly of said optical axis, to prevent coarse particulate external to the zoom lens from invading the zoom lens.

24. A water-proof and/or drip-proof lens mount having a plurality of groups of lenses arranged movably, comprising:

a fixed frame fixedly mounted on a camera body;

an angular movement frame fitted about an outer periphery of said fixed frame for angular movement;

a first lens group retaining frame retracted by angular movement of said angular movement frame in an optical-axis direction;

a third lens group retaining frame moved in the optical-axis direction integrally with said first lens group retaining frame upon a focal-length modifying operation and moved separately upon a focusing operation;

a cam frame having an end-face cam on an end face of the cam frame in the optical-axis direction, said cam frame moving in the optical-axis direction integrally with said first lens group retaining frame, said cam frame being mounted for angular movement and being angularly moved around an optical axis by the focal-length modifying operation;

a fourth lens group retaining frame abutted against an end-face cam of said cam frame and retracted in the optical-axis direction by angular movement of said cam frame;

a first flexible element for biasing said fourth lens group retaining frame against the end-face cam of said cam frame;

a second lens group retaining frame angularly moved together with the angular movement of said cam frame upon the focal-length modifying operation, and moving in the optical-axis direction by an end-face cam which is provided on said third lens group retaining frame;

a second flexible element for biasing said second lens group retaining frame against the end-face cam of said third lens group retaining frame;

angular-movement regulating means for regulating such that said third lens group retaining frame is not moved angularly by angular movement of said second lens group retaining frame;

focusing drive means for retracting said third lens group retaining frame in the optical-axis direction by control from a camera body; and water-proof or drip-proof means arranged between said fixed frame, said first lens group retaining frame and a front cover of the camera body, wherein said angular-movement frame is moved angularly to move said first lens group retaining frame to said fourth lens frame retaining frame in the optical-axis direction to modify a focal length, and wherein said focusing drive means is driven to retract said second lens group retaining frame and said third lens group retaining frame integrally in the optical-axis direction, to thereby perform focal adjustment.

* * * * *